United States Patent [19]

Syverson et al.

[11] Patent Number: 5,502,368

[45] Date of Patent: Mar. 26, 1996

[54] HYBRID ALTERNATOR WITH VOLTAGE REGULATOR

[75] Inventors: Charles D. Syverson, North Mankato, Minn.; William P. Curtiss, Chelsea, Mass.

[73] Assignee: Ecoair Corp., New Haven, Conn.

[21] Appl. No.: 251,530

[22] Filed: Jun. 6, 1994

[51] Int. Cl.⁶ .................................................. H02H 7/06
[52] U.S. Cl. ........................... 322/28; 322/29; 322/46; 310/181
[58] Field of Search ........................ 322/46, 23; 363/98

[56] References Cited

U.S. PATENT DOCUMENTS

| | | | |
|---|---|---|---|
| 2,482,875 | 9/1949 | Sawyer | 322/50 |
| 2,516,114 | 7/1950 | Green | 171/252 |
| 2,722,652 | 11/1955 | Brainard | 322/25 |
| 2,767,368 | 10/1956 | Kober | 322/57 |
| 2,990,508 | 6/1961 | Thompson | 322/25 |
| 3,214,675 | 10/1965 | Foster | 322/46 |
| 3,250,973 | 5/1966 | Dawson | 318/147 |
| 3,411,027 | 11/1968 | Rosenberg | 310/181 |
| 3,508,095 | 4/1970 | Knudson et al. | 310/156 |
| 3,510,752 | 5/1970 | Raver et al. | 322/28 |
| 3,512,075 | 5/1970 | Raver et al. | 322/28 |
| 3,512,076 | 5/1970 | Larson et al. | 322/28 |
| 3,566,251 | 2/1971 | Hoglund | 322/46 |
| 3,601,685 | 8/1971 | Kuhn | 322/28 |
| 3,609,514 | 9/1971 | Nowakowski et al. | 322/28 |
| 3,671,788 | 6/1972 | Knudson et al. | 310/156 |
| 3,676,764 | 7/1972 | Syverson | 322/51 |
| 3,742,336 | 6/1973 | Bedford | 321/69 |
| 4,004,211 | 1/1977 | Takao et al. | 322/63 |
| 4,007,387 | 2/1977 | Rustecki | 310/42 |
| 4,015,189 | 3/1977 | Gorden | 322/46 |
| 4,035,713 | 7/1977 | Kawamoto et al. | 322/28 |
| 4,219,739 | 8/1980 | Greenwell | 290/46 |
| 4,308,492 | 12/1981 | Mori et al. | 320/32 |
| 4,379,990 | 4/1983 | Sievers et al. | 322/99 |
| 4,383,213 | 5/1983 | Tyrner | 322/158 |
| 4,408,152 | 10/1983 | Szippl et al. | 322/29 |
| 4,422,138 | 12/1983 | Kornrumpf | 363/21 |
| 4,441,043 | 4/1984 | DeCesare | 310/46 |
| 4,442,396 | 4/1984 | Hucker | 322/21 |
| 4,465,920 | 8/1984 | Hoyt et al. | 219/133 |
| 4,500,828 | 2/1985 | Nishihara | 322/46 |
| 4,513,216 | 4/1985 | Muller | 310/156 |
| 4,564,778 | 1/1986 | Yoshida | 310/177 |
| 4,631,435 | 12/1986 | McCarty | 310/156 |
| 4,633,160 | 12/1986 | Graham | 322/20 |
| 4,642,502 | 2/1987 | Carpenter et al. | 310/156 |
| 4,654,551 | 3/1987 | Farr | 310/112 |
| 4,656,379 | 4/1987 | McCarty | 310/181 |
| 4,658,167 | 4/1987 | Popov et al. | 310/156 |
| 4,683,388 | 7/1987 | DeCesare | 310/46 |
| 4,710,686 | 12/1987 | Guzik | 318/293 |
| 4,739,201 | 4/1988 | Brigham et al. | 310/49 |
| 4,755,736 | 7/1988 | Fluegel | 322/46 |
| 4,777,397 | 10/1988 | Parshall | 310/156 |
| 4,830,412 | 5/1989 | Raad et al. | 290/31 |

(List continued on next page.)

Primary Examiner—Steven L. Stephan
Assistant Examiner—Nicholas Ponomarenko
Attorney, Agent, or Firm—DeLio & Peterson

[57] ABSTRACT

A hybrid alternator includes a stator and a rotor, with the rotor having longitudinally separate wound field and permanent magnet rotor portions. A rotor excitation circuit applies a forward polarity to the wound field rotor portion to increase output in a boosting mode at low RPMs and a reverse polarity to decrease output at high RPMs in a bucking mode to maintain a constant voltage output. Alternative embodiments combine a magnetic flux concentrating design for efficient low speed operation with integral strength for high speed capability. Dual voltage output is provided either through dual stator windings or through a voltage converter circuit. Single voltage output is provided using only one stator winding. A three state voltage regulator allows voltage regulation without inducing reverse currents onto the power bus in the lightly loaded or no battery conditions. The regulator has automatic interlocking to automatically turn on and off without risking damage to the vehicle electrical system.

28 Claims, 11 Drawing Sheets

U.S. PATENT DOCUMENTS

| | | | |
|---|---|---|---|
| 4,882,515 | 11/1989 | Radomski | 310/263 |
| 4,959,577 | 9/1990 | Radomski | 310/263 |
| 4,978,878 | 12/1990 | Dijken | 310/268 |
| 4,980,595 | 12/1990 | Arora | 310/263 |
| 5,015,902 | 5/1991 | Leitgeb | 310/156 |
| 5,132,581 | 7/1992 | Kusase | 310/263 |
| 5,132,605 | 7/1992 | Boella et al. | 322/99 |
| 5,177,391 | 1/1993 | Kusase | 310/263 |
| 5,254,935 | 10/1993 | Vercesi et al. | 322/29 |
| 5,376,877 | 12/1994 | Kern et al. | 322/32 |
| 5,397,975 | 3/1995 | Syverson | 322/46 |

HYBRID ALTERNATOR WITH VOLTAGE REGULATOR

BACKGROUND OF THE INVENTION

1. Field of the Invention

This invention relates to alternators of the type that are used in vehicles to provide electrical power for running accessories and charging batteries. More particularly, this invention relates to a high-efficiency hybrid alternator in which the rotating magnetic field is provided by a rotor having a permanent magnet portion and a wound field portion operating in combination. The invention also relates to voltage regulators specially designed to automatically regulate the output voltage of hybrid alternators.

2. Description of Related Art

The automotive industry has been attempting to increase the efficiency of motorized vehicles, both at idle and at running speeds. It is particularly important to increase efficiencies at idle because it has been determined that about one half of all the consumption of fuel takes place at idle. The alternator design most commonly found in vehicles has been used for approximately twenty-five to thirty years and is inexpensive to produce, but exhibits very low efficiency levels, as low as 40–50%. The problem is particularly acute at low RPMs where high excitation levels in the rotor winding are required to produce the desired voltage, leading to very low efficiency.

In conjunction with the desire for higher efficiency is the need to supply alternators that have larger electrical ratings because modern vehicles have many more motors and require much more electrical power. Moreover, fuel efficiency of vehicles is closely related to the weight of the vehicle and it is desirable to decrease the weight of the alternator so as to minimize the total vehicle weight. These objectives are achieved when the efficiency of the alternator is increased.

The increased power usage in vehicles has also led to an interest in using components that operate at higher voltages than the standard 12 volts presently used in automobiles. At the same time, it is foreseen that 12 volt power will be required in such vehicles in addition to the higher voltage.

It is known to provide dual voltage alternators by providing two windings on the stator. However, when a single winding is used on the rotor, it is difficult to properly regulate the two different voltage outputs as different levels of rotor excitation current may be required for the different circuits. Single and dual voltage alternators of the type represented by the present invention may also be used in various non-engine driven applications, such as wind or water driven applications, for the efficient generation of electrical power.

Hybrid alternators significantly increase their efficiency by using permanent magnets to produce a high level of magnetic flux immediately, while the alternator is operating at low speed. Using the hybrid alternator disclosed herein, the alternator will produce full rated alternator current and voltage output at engine idling speed when installed in an automobile or other vehicle. This can be contrasted with prior art alternators that are incapable of producing their full rated output until they are turning at speeds far above their rotational speed at idle.

The full rated output of the hybrid alternator is achieved at low speed by supplementing the magnetic flux produced by the permanent magnets. The supplementing magnetic flux is produced by a rotor winding having a forward rotor winding current induced therein by a forward polarity voltage applied across the winding. This is referred to as the boosting mode or the forward polarity mode in which the wound field induced magnetic field is in the same direction as, and supplements, the permanent magnet induced magnetic field.

As the alternator RPM increases, however, the magnetic flux from the permanent magnets produces a greater output and the need for the supplementing flux from the rotor winding decreases. Ultimately, at a sufficiently high speed, all of the alternator's rated output is available solely from the permanent magnet induced magnetic field, and no additional current is needed in the rotor winding. Generally, this transition occurs at a speed well below the maximum anticipated operating speed of the alternator.

As the rotor speed exceeds this transition point, with the engine operating at a high speed, the flux from the permanent magnets is too great and must be reduced to avoid producing damaging overvoltages and overcurrents. This is accomplished by operating the hybrid alternator in the bucking mode or the reverse polarity mode in which a reverse polarity voltage is applied to the rotor winding. The reverse polarity voltage produces a reverse current in the rotor winding. The reverse current generates a magnetic flux which opposes the magnetic flux from the permanent magnets, thereby reducing the output of the alternator to maintain the desired output voltage.

The necessity for both forward and reverse rotor winding excitation current imposes certain limitations and requirements on the voltage regulator for the hybrid alternator which are not required in the case of conventional alternators. Although hybrid alternators of a low efficiency claw pole or Lundell type design are known, the existence of these limitations and requirements has not heretofore been recognized by the art even when producing voltage regulators for hybrid alternators.

A first problem is related to the inductive effects of switching the highly inductive rotor winding, particularly to transition between the forward and reverse polarity excitation modes. The problem is most acute when the alternator is lightly loaded.

Current induced in the field winding stores significant energy in the magnetic field of the rotor winding. This energy can cause voltage spikes due to sudden load changes or when switching the voltage to drive the rotor winding. To reduce the output voltage of a hybrid alternator, the prior art has simply indicated that the reverse polarity mode should be applied to reverse the current of the field winding. However, before the current can be reversed, the previously induced magnetic field must collapse. During this collapse, the forward current originally induced in the forward polarity mode continues back up into the main power bus leading to the battery and all of the automobile accessories.

If a battery is connected to the alternator as in the normal case, the battery can be relied upon to absorb any net negative current after the battery's other loads. Alternatively, a large capacitor can be used to absorb this energy. However, the first method cannot be relied upon as a battery may not always be present capable of absorbing the reverse current. Using a capacitor is extremely expensive, particularly when capacitors adequate for handling all the energy stored in the rotor winding are used that are temperature rated for use under the hood of an automobile.

If the battery were to be removed, without a capacitor there would be no place for the net reverse current on the main power bus to go unless a large filter capacitor is placed across the circuit where the battery connection normally exists. If moderate frequency pulse width modulation techniques are employed, this capacitor can be of reasonable value. However, for lowest costs and small physical size an aluminum electrolytic capacitor would be desirable. Aluminum electrolytic capacitors, however, are not normally designed to tolerate temperatures in excess in 105° C. and thus, they could not be easily housed in the hot environment of the alternator in the vicinity of the vehicle engine.

Even if they were somewhat isolated from the hot alternator itself so as to avoid temperatures above 105° C. the life of capacitors is rapidly reduced with increasing temperature. Thus, the under the hood environment would normally not permit the use of aluminum electronics. Higher temperature tantalum capacitors could be used but they are physically larger and much more expensive and are thus less attractive for a cost sensitive high volume automotive application.

Also, even if capacitors are used to absorb the switching transients, there is still a potential problem due to the large energy storage and long time constant of the field coil. For example, if the alternator speed or load should abruptly change so as to cause the alternator regulator to change the field voltage polarity from near full voltage (e.g. boost in the forward polarity mode) in one direction to significant voltage in the other direction (e.g. buck in the reverse polarity mode) a large voltage transient would tend to occur if no battery were present and the system was unloaded (except for field coil).

In this situation the initial energy in field coil would tend to go into the capacitor and the voltage would be excessive unless the capacitor were extremely large or the bus voltage were clamped.

Although only moderate sized capacitors would be required to handle the ripple current from the pulse with modulation, the capacitor would have be physically very large to be able handle the high energy in a field winding without creating an excessive voltage. Even if voltage clamps were employed to limit the capacitor voltage, the costs would be excessive, there would be continuing concerns over reliability due to the high temperature environment, and the size of the components would create a problem in the cramped environment under the hood.

A solution allowing the use of pulse width modulation techniques, even if the battery is not present, and one that does not require a large capacitor is needed.

A second, more subtle, problem is that precautions must be taken to prevent the voltage regulator that is providing the reverse current in the reverse polarity mode from being inactivated when the vehicle is turned off. At very high engine and alternator speeds, the magnetic flux from the permanent magnet is almost completely cancelled by the oppositely directed magnetic flux in the hybrid rotor winding. If the cancelling flux were to be immediately turned off, e.g. by turning off an ignition switch with the alternator operating at a high rotational speed, the output voltage of the alternator would rapidly increase to damaging levels for the electrical components in a typical automobile.

The present invention incorporates an automatic interlock which powers the voltage regulator automatically and independently of the ignition system of the vehicle to prevent it from inadvertly being deactivated. The design of the automatic interlock is such that little or no current is drawn from the vehicle battery when the vehicle is off, which might tend to discharge the vehicle battery.

The preferred embodiment of the voltage regulator also incorporates transient voltage suppression in a novel way that permits certain switches (preferably FETs) needed for the purpose of switching the rotor winding between forward and reverse polarity modes to perform a second function of suppressing voltage transients that might damage the voltage regulator or other systems on the battery bus.

In view of the problems with the prior art, one object of the present invention is to provide an alternator which operates efficiently at low RPMs.

Another object of the invention is to provide an alternator which uses a permanent magnet assembly in the rotor to provide a rotating permanent magnetic field in combination with a rotating variable magnetic field generated by a rotor winding.

Still another object of the invention is to provide an alternator which weighs less than current alternators at the same output power or which produces a higher output at the same weight.

Yet another object of the present invention is to provide an efficient dual voltage alternator, preferably in which both voltages are well regulated under varying loads.

Another object of the invention is to provide a voltage regulator for a hybrid alternator that automatically interlocks to prevent the regulator from being deactivated when the alternator is in the reverse polarity mode.

Still another object of the invention is to provide a voltage regulator for a hybrid alternator which provides voltage transient suppression.

A further object of the invention is to provide a voltage regulator for a hybrid alternator that allows the alternator to operate without a battery attached and without requiring expensive capacitors or voltage clamps.

Yet another object of the invention is to provide a hybrid alternator which provides the maximum rated output voltage and current when a vehicle in which the alternator is installed is operating at idle speed.

A further object of the invention is to provide an alternator which is maximumly cooled through radio cooling slots location in the stator.

SUMMARY OF THE INVENTION

The above, and other objects which will be apparent to those skilled in the art, are accomplished in the present invention in which a hybrid alternator includes a stator with a stator winding surrounding a rotor with a wound field rotor portion and a permanent magnet rotor portion acting in combination. The wound field rotor portion has multiple poles and is mounted on a rotor shaft for rotation within a first longitudinal region of the stator. The permanent magnet rotor portion also has multiple poles, corresponding in number to the number of poles in the wound field rotor portion, and is mounted on the shaft in one or more longitudinally separate locations relative to the wound field rotor portion for rotation within one or more additional longitudinal regions of the stator.

The permanent magnet rotor portion may include a plurality of permanent magnets, one for each pole, disposed about its perimeter to produce a permanent magnetic field requiring no power to maintain. Alternatively, the permanent magnetic field may be generated by one or more solid permanent magnet disks with alternating magnetic poles formed therein. Other suitable magnetic geometries may be devised by those skilled in the art.

The wound field rotor portion includes a rotor winding which may be excited with a forward or reverse polarity current to increase or decrease the output, respectively. A rotor excitation circuit provides the forward or reverse polarity excitation to the rotor windings as necessary to maintain a desired constant output voltage under varying load conditions. The rotor excitation circuit preferably uses pulse width modulation to vary the amount of excitation and the output.

In the preferred design, the alternator permanent magnet poles and wound field poles are arranged in a salient pole configuration. The permanent magnet field may be formed by individual permanent magnets or by solid disk magnets with multiple magnetic poles. The direction of magnetization may be oriented perpendicular to the rotor shaft, or in alternative embodiments which provide flux concentration, the direction of magnetization may be oriented longitudinally or circumferentially, with magnetic flux channeling elements turning the flux to cross the air gap radially.

In a preferred dual voltage configuration a voltage converter circuit generates the second voltage and derives its power from the output of a single three phase stator winding. Prior art dual stator windings may also be used to generate two different output voltages.

In a first alternative embodiment of the invention, the permanent magnet portion of the rotor includes a solid disk bonded magnet magnetized longitudinally with multiple poles. One or more of the disks may be used in one or more permanent magnet rotor portions. Flux channeling to the air gap and flux concentration is provided by pole segments of a high magnetic permeability material. The pole segments also acts to support the wound field coil extensions and permit the alternator to operate at high RPMs.

A second alternative embodiment of the invention uses embedded permanent magnets. The magnets are positioned in spaced circumferential locations, are inserted with alternate polarity and oriented with circumferential magnetization. Flux is channeled to the air gap and flux concentration is achieved by pole pieces of a magnetically permeable material. The magnets and pole pieces are magnetically isolated from the shaft by the use of a non-magnetic hub material.

The hybrid alternator is designed such that it produces the full rated output voltage and current when the vehicle is operating at idle speed and continues to produce that full rated output over its entire operating range of speeds.

The invention also comprises a voltage regulator for the hybrid alternator. In a first embodiment of the voltage regulator, a switching bridge is used to steer current through the rotor winding in the forward and reverse directions. The switching bridge is uniquely controlled to operate in three states which include 1) a forward polarity mode in which a forward voltage is applied to the rotor winding, 2) a reverse polarity mode in which a reverse polarity is applied to winding, and 3) a decay mode in which no voltage is applied to the winding, but the current induced in the forward or reverse polarity mode is allowed to decay. In the most highly preferred construction of this embodiment, the control system is digital, and the switching bridge is constructed of field effect transistors.

In this construction, the decay current circulates through the lower two FETs of the bridge, and sensing circuitry detects the decay current and inhibits the voltage regulator from switching to an opposite polarity mode unless the current has decayed to a value near zero.

The most highly preferred construction of the voltage regulator employs an automatic interlock to automatically power the voltage regulator and to keep it powered as long as the alternator is rotating. The bridge circuit is uniquely designed to suppress transient voltage spikes, thereby serving a dual function.

To meet the demanding output power requirements, high energy densities are required, particularly in view of the desire to maintain a relatively small package size for the alternator. This means that the alternator operates at relatively high temperatures which are of concern for the expected life of the electronics and in preventing the permanent magnets from becoming demagnetized. Accordingly, the preferred embodiment of the hybrid alternator uses a novel method of ducting outside cooling air through slots which are located circumferentially around the center of the stator winding section of the housing.

This can be done in the hybrid alternator design shown herein because of the division of the alternator between the permanent magnet section and the wound field rotor section which divides the stator into two regions separated by a region in which there is little or no magnetic flux.

Another embodiment of the hybrid alternator uses a novel connection arrangement between the rotor winding and the stator winding. By using this arrangement, a simplified voltage regulator may be used that significantly reduces component costs. The voltage regulator alternately connects one end of the rotor winding between the positive end of the battery and ground. The other end of the rotor winding is connected to the neutral point of the stator (which operates at approximately half the battery voltage). The switching circuit in the regulator needs only two switches for alternately connecting the rotor to transition between the forward and reverse polarity modes.

The invention also includes the method of controlling bidirectional current flow through the winding of alternator with a three state regulator in which current magnitude (regardless of direction) is increased only in the forward and reverse polarity modes, and current magnitude is decreased only in the decay mode with recirculating current through the winding being allowed to decay.

DESCRIPTION OF THE PREFERRED EMBODIMENTS

Figure 1:
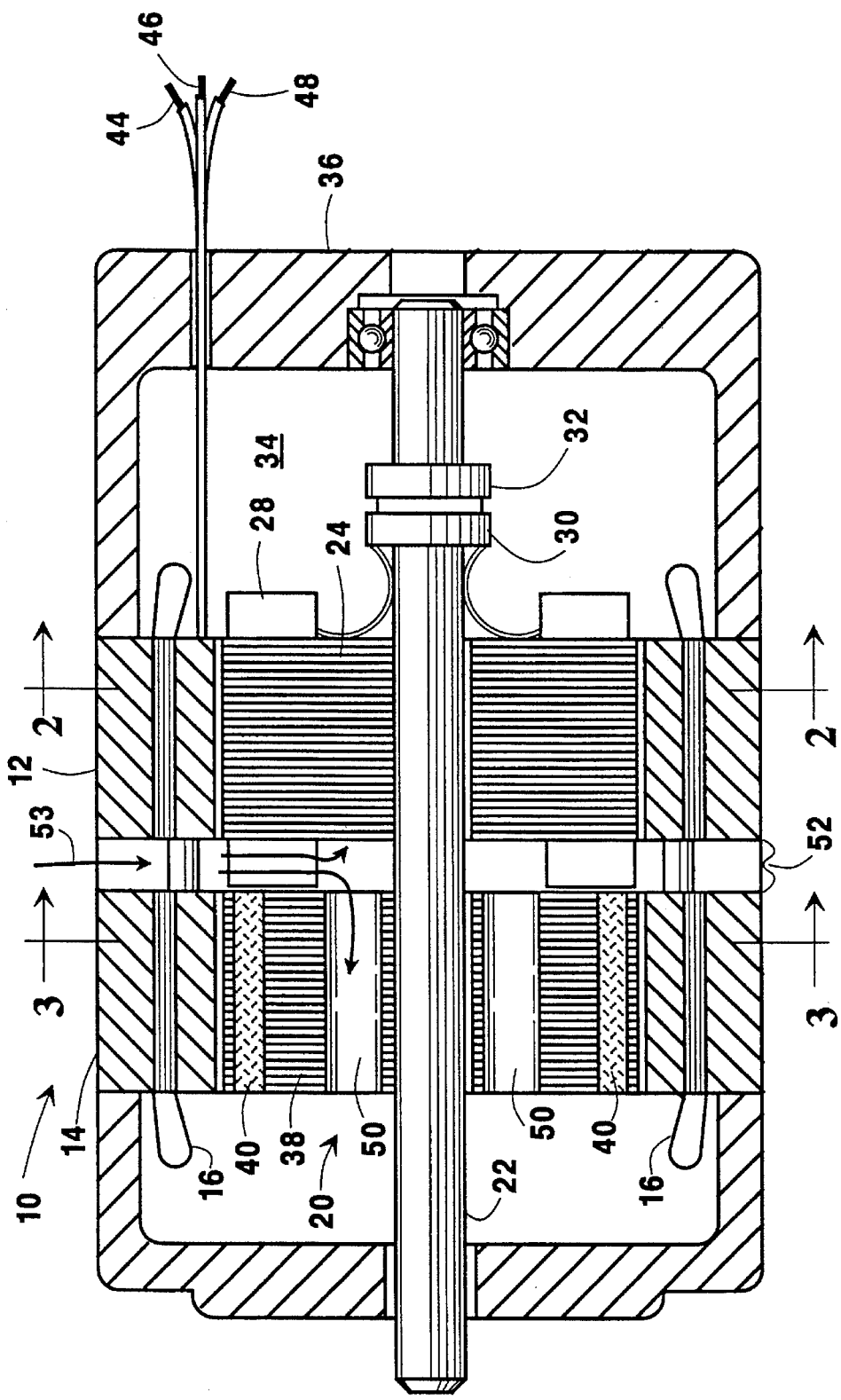
FIG. 1 is a longitudinal cross sectional view parallel to and through the shaft of a hybrid alternator according to the present invention.

Referring to FIG. 1, the alternator of the invention includes a stator 10 having a first longitudinal stator region 12 and a second longitudinal stator region 14. A three phase stator winding 16, as shown in FIG. 4, extends through slots 18 (shown in FIGS. 2 and 3) formed on the interior of the stator 10.

A rotor, generally indicated with arrow 20 is mounted for rotation within the stator 10 on a shaft 22. The rotor includes a wound field rotor portion 24 which rotates within the first stator region 12 and a permanent magnet rotor portion 38 which rotates within the second stator region 14.

The wound field rotor portion 24 has a rotor winding 28 which can be excited to produce a magnetic field whenever current is applied through slip rings 30, 32 on the shaft 22. Conventional brushes (not shown) would be mounted within region 34 of case 36 to make contact with slip rings 30, 32 and allow excitation current to be supplied to the rotor winding.

The permanent magnet rotor portion 38 is mounted on the shaft 22 in longitudinally spaced relation from the wound field rotor portion 24. It includes a plurality of permanent magnets 40 disposed about its perimeter mounted such that the direction of magnetization is radially oriented relative to the rotor shaft. The magnets maintain a multiple pole permanent magnetic field which extends across the air gap between the rotor and stator.

Figure 2:
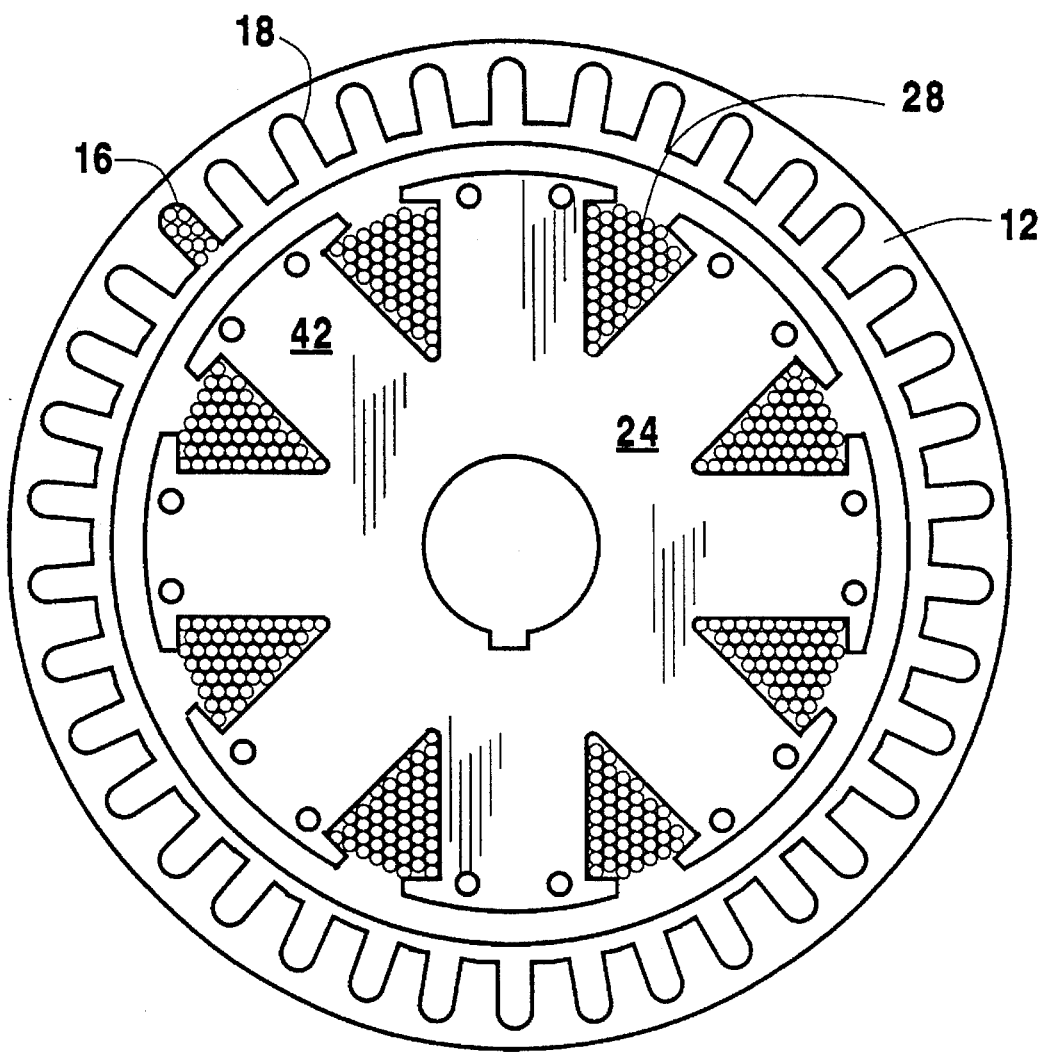
FIG. 2 is a cross sectional view along the line 2—2 perpendicular to the rotor shaft and through the wound field rotor portion of the alternator.

FIG. 2 is a cross section through the first region 12 of the stator within which the wound field rotor spins. The wound field rotor is conventionally formed from multiple thin laminations having the cross sectional shape seen in FIG. 2 stacked adjacently along the rotor shaft. Alternately, the wound field rotor poles may be constructed using solid cast magnetic material. Each lamination on the rotor includes a plurality of poles 42 around which the rotor windings 28 are arranged with alternate poles being wound in opposite directions to produce alternating north and south magnetic fields.

Thus, the first region 12 of the stator and the wound field rotor portion 24 of the rotor act as a salient pole alternator to generate output from the stator windings 16 through output leads 44, 46 and 48 (shown in FIGS. 1 and 4) whenever an excitation current is supplied to the rotor windings 28.

Hybrid Alternator—Radially Magnetized Permanent Magnets

Figure 3:
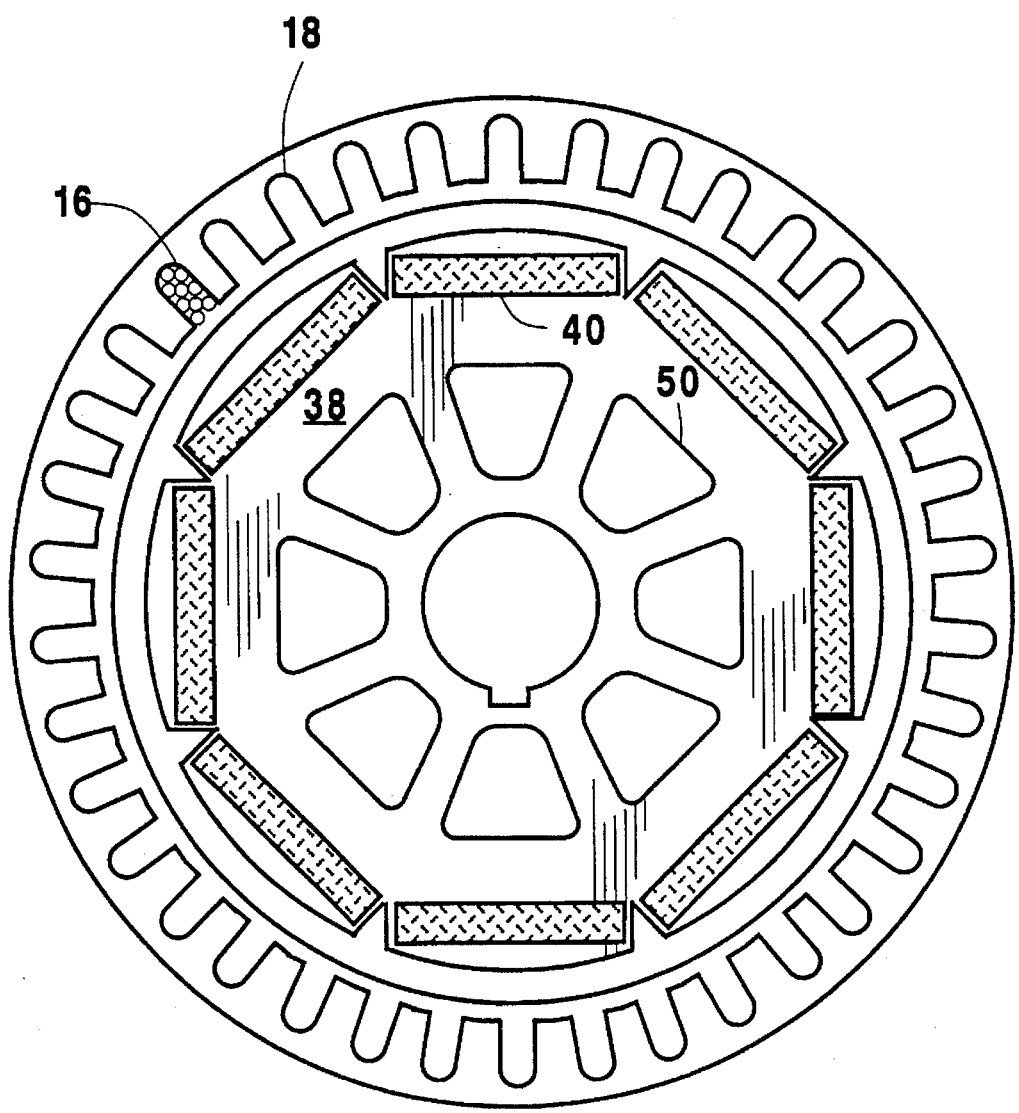
FIG. 3 is a cross sectional view along the line 3—3 perpendicular to the rotor shaft and through the permanent magnet rotor portion of the alternator.
Figure 4:
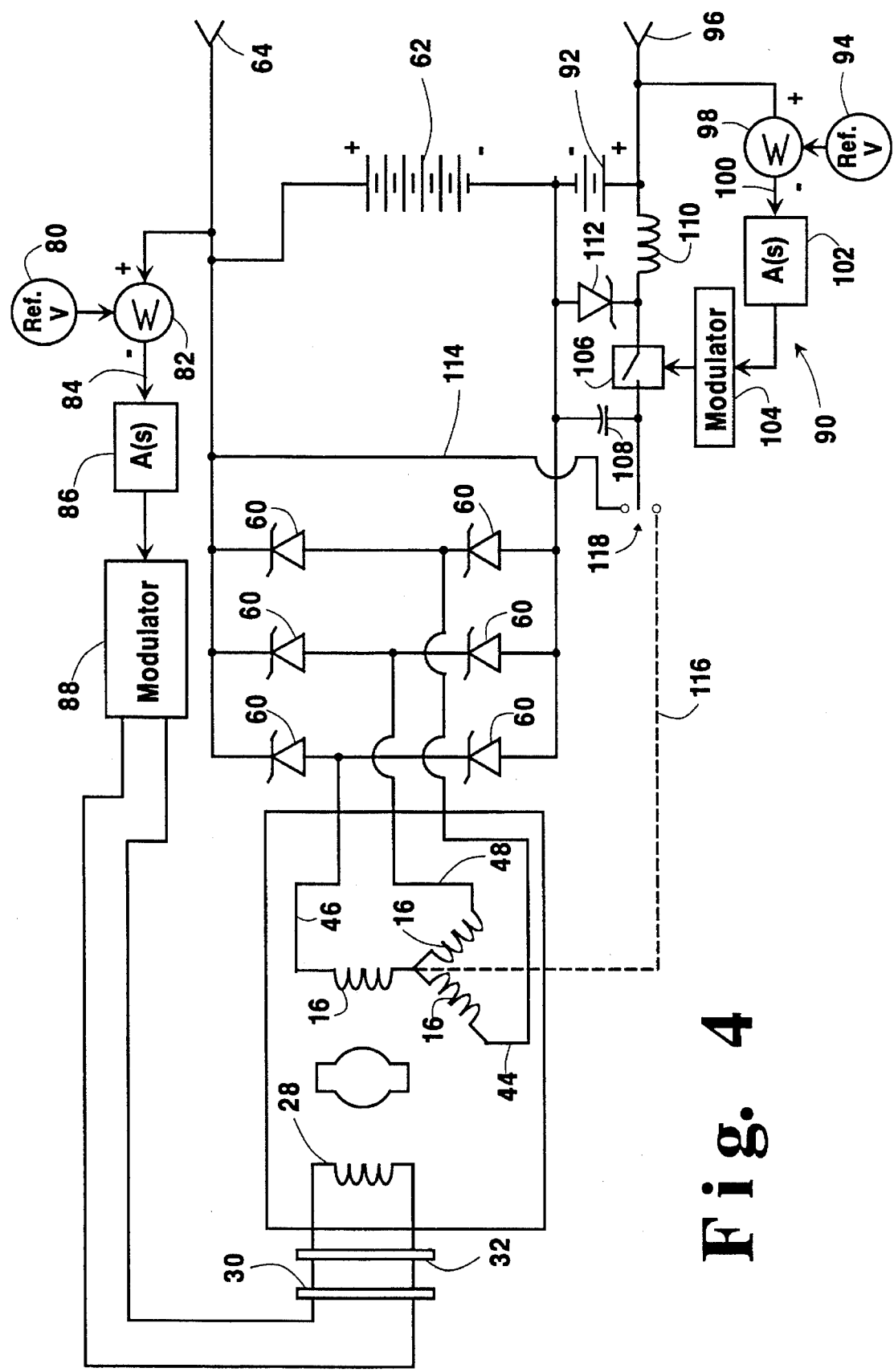
FIG. 4 is an electrical circuit diagram of the alternator of the present invention with a rotor excitation circuit for voltage regulation and a voltage converter circuit for producing a second output voltage.

FIG. 3 is a cross section through the permanent magnet rotor portion of one embodiment of the alternator. The permanent magnet rotor portion includes eight (8) permanent magnets 40 shaped as rectangular slabs and held in the permanent magnet rotor laminations 38. Alternate designs may use more or less than eight magnetic poles, but will always have the same number of poles as the wound field rotor. Shapes other than rectangular slabs may be used, for example the thickness of the slab may be varied to match the curve of the rotor.

Each permanent magnet slab is magnetized through its thickness and mounted such that the direction of magnetization extends radially, i.e., in a direction which is perpendicular to the shaft 22 and normal to the large faces of the slab 40.

The slabs are held in openings in the laminations 38 around the perimeter of the permanent magnet rotor and alternate, with the north pole of one slab facing outward and the north pole of the next slab facing inward. In this way, the magnetic field generated by the wound rotor adds to the permanent magnetic field when a forward excitation current is applied to the rotor winding 28 and subtracts from the permanent magnetic field when a reverse current is applied. The permanent magnets in the design illustrated are formed of neodymium, however other magnetic materials such as ceramic or samarium-cobalt magnets may also be used and may be preferred in particular applications. In production, the neodymium magnets are nickel plated.

In addition to the openings which hold the magnets, the laminations 38 include multiple openings 50 to reduce weight and allow for cooling air flow through the alternator.

Those familiar with electric machines in general and alternators in particular will understand that the permanent magnets 40 provide a permanent magnetic field at the rotor which induces a voltage in the stator winding 16 whenever shaft 22 is rotated. Rotation of the shaft is generally accomplished with a belt and pulley drive, however a gear drive or other means may also be applied.

In the design shown in FIG. 1, the stator windings 16 extend from the first stator region surrounding the wound field rotor portion continuously through the second stator region surrounding the permanent magnet portion. Thus, as shaft 22 rotates, a voltage is induced in the stator winding 16 which is partially a result of the magnetic field from the permanent magnets and partially a result of the magnetic field generated by excitation current in the windings 28 of the wound field rotor portion. It is also possible to use separate windings on the two stator sections and combine their outputs electrically.

In the design shown in FIGS. 1, 2 and 3, the stator portion of the alternator is the same in region 14 as in region 12 and includes identical slots 18 and stator windings 16. The slots 18 may, however, be skewed such that there is a twist equal to one or more stator slot pitch along its length. The purpose of the twist is to prevent magnetic cogging. In the absence of such a twist, magnetic cogging and unwanted vibration is created due to variable reluctance caused by slot openings in the air gap between the stator and the rotor.

The stator is formed as a stack of thin laminations of electrical grade steel. Each member of the stack is rotationally offset from its adjacent members sufficiently to form the twist of one stator slot pitch along its length.

Although it is not shown in FIG. 3, the permanent magnet portion may include a premanufactured cylindrical sleeve of a lightweight but strong material such as a carbon fiber bonded in a resin. The sleeve has a thin wall thickness and a diameter equal to the diameter of the permanent magnet rotor portion. It surrounds the permanent magnet rotor portion and prevent the magnets 40 from being thrown outward and damaging the stator under the centrifugal force generated as a result of high speed operation.

As the alternator shaft 22 begins to spin, the magnet portion will induce a voltage in the stator winding 16 which is be rectified to produce a desired output voltage. Referring to FIG. 4, a typical stator winding 16 is composed of three legs connected to a full wave voltage rectifier formed by six power diodes 60. The power diodes 60 rectify the output and provide charging power to charge battery 62 and to supply a vehicle with power for accessories over output 64.

At low RPMs the output from the alternator due to the permanent magnets is insufficient to provide the full voltage needed at output 64. Accordingly, a forward excitation polarity is applied to rotor winding 28. This increases the current in the rotor, increases the strength of the magnetic field generated by the rotor winding, and increases the output from the stator windings 16 to boost the output voltage to the desired level. The forward polarity and forward current induced thereby is the current and polarity which causes the magnetic field from the rotor winding to add to the magnetic field from the permanent magnets in a boosting mode.

The necessity to boost the output by supplying a forward excitation current to the rotor windings 28 occurs only at low engine RPMs. As the engine speed increases, the output from the stator increases and a point is reached at which the desired output voltage is produced by the stator solely due to the permanent magnet rotor portion. At this speed, no excitation current needs to be supplied to the rotor winding 28. Above this speed, however, the permanent magnet rotor portion would produce an over voltage in the stator windings.

Figure 5:
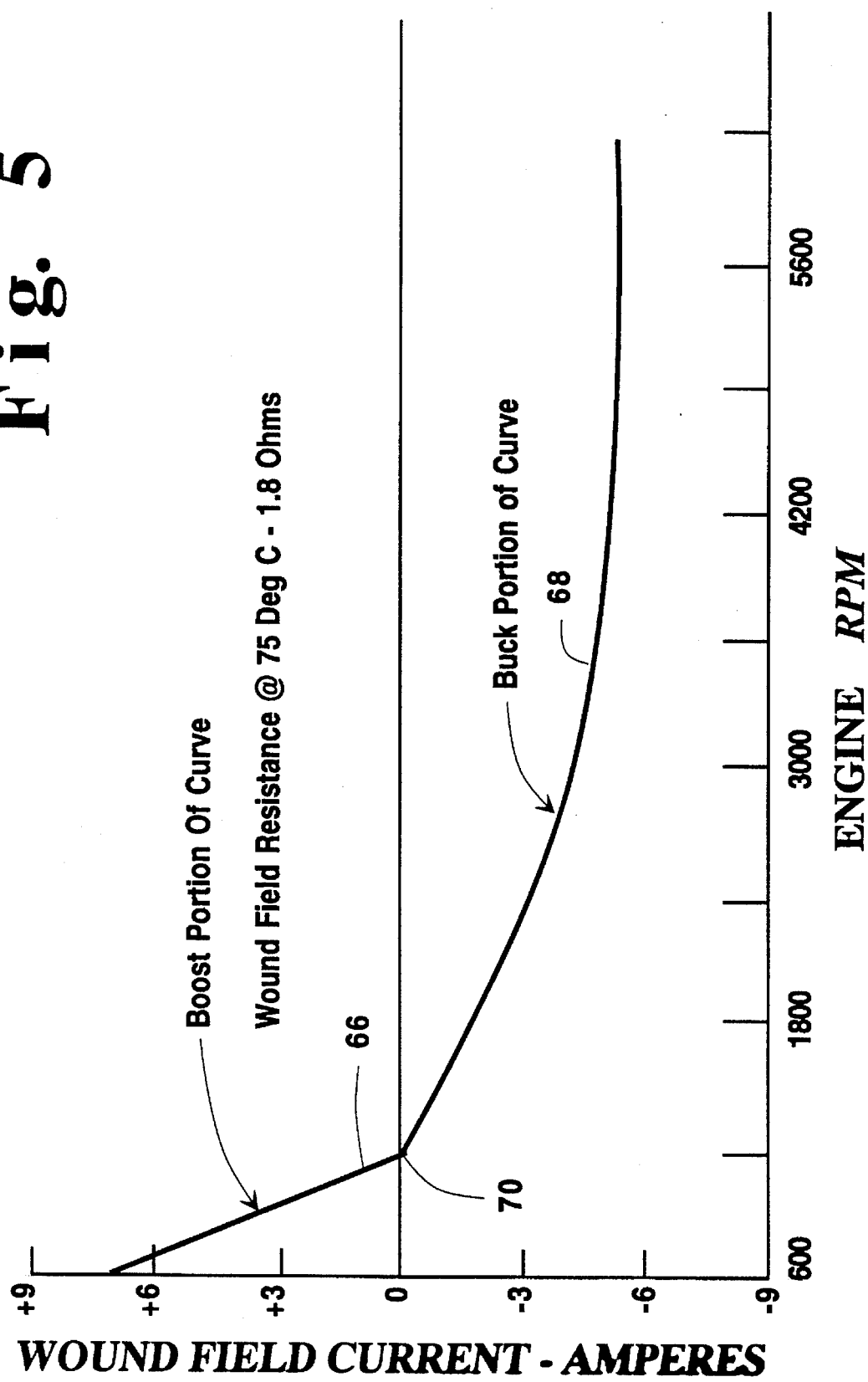
FIG. 5 is a graph of field current versus engine RPM necessary to maintain a constant voltage output in a typical embodiment of the present invention.

To counteract the excess voltage at high RPMs, the rotor winding 28 is supplied with a reverse excitation current which decreases output from the alternator in a bucking mode. FIG. 5 provides a graph of wound field current in rotor winding 28 needed to maintain a constant output voltage at output 64 from the stator windings 16 as a function of engine RPM. The graph is provided for illustration of one possible implementation of the invention. Changes in gearing of the alternator to the engine, the number of turns and resistance of windings on the rotor and stator, and the relative strengths of the fields generated by the magnets and rotor winding all will affect the actual curve for any specific application.

Referring to FIG. 5, it can be seen that the boost portion of the curve 66 in which a forward excitation current is required occurs from idle at approximately 600 RPM until 1200 RPM is reached. As the RPM increases from 600 RPM to 1200 RPM, the amount of forward excitation current needed to maintain the constant output voltage decreases, reaching zero at point 70. At this point, all of the excitation is derived from the permanent magnet rotor portion. At speeds in excess of 1200 RPM, the buck portion 68 of the curve is entered. In this section of the curve, a reverse excitation, indicated by the negative current values on the vertical axis, is required to prevent the output voltage from exceeding the desired level.

The crossing point 70 between the boosting mode and bucking mode may be adjusted by varying the relative proportion of output between the wound field rotor portion and the permanent magnet rotor portion. Referring to FIG. 1, this can be accomplished by adjusting the strength of the permanent magnets 40 or the field generated by the rotor winding. Alternatively, it may be changed by varying the relative sizes of the permanent rotor portion 14 and the wound field rotor portion 12. In FIG. 1, these have been illustrated as being of approximately equal size, but the ratios may be varied as desired to adjust the crossing point between the boost and buck regions of operation.

Dual Voltage Hybrid Alternator

In the simplest form of the invention shown in FIG. 1, the stator winding 16 uses a conventional wiring layout shown in FIG. 4. However, other stator winding arrangements may be employed. For example, it is known to wire the stator with two independent windings so as to produce two different output voltages. The present invention contemplates this method of dual voltage generation where it is desired to have a 12 volt output as well as a higher voltage output, typically 48 volts. A preferred method of dual voltage operation, however, is to use a voltage converter circuit of the type described in connection with FIG. 4.

Other variations of the invention are also contemplated. For example, in a single voltage configuration, the stator winding may comprise two independent stator windings, one found only within the first region 12 surrounding the wound field rotor portion and one found within the second region 14 surrounding the permanent magnet rotor portion. The outputs from these separate stator windings are then combined electrically as needed to produce the desired output voltage.

Continuing to refer to FIG. 1, it can be seen that there is a gap 52 between the two regions of the stator. The gap is optional, but if used, should be made of a relatively low magnetic permeability material to isolate the magnetic regions of the stator 12 and 14. The gap may be a simple air gap, or it may be partially or completely filled with a solid material of low magnetic permeability such as plastic or the like. Where the stator winding 16 extends from one region 12 completely through the gap to the second region 14, the gap may be filled with a material having the same cross sectional shape perpendicular to the rotor as the stator to provide a continuous slot 18 within which the stator wires forming winding 16 may lie.

Hybrid Alternator—Radial Cooling Slots Through Stator

In the preferred embodiment, the air gap 52 between stator sections 12 and 14 is not solid, but is open to the outside air. Cooling air is permitted to enter the interior of the alternator through air gap 52 between the stator sections where it is then ducted out of the alternator at the ends. Typically this would be done by fans located at one or both ends of the alternator (not shown).

The two section geometry for the stator illustrated in FIG. 1 allows the cooling air flow to be ducted into the center region of the alternator where the cooling is most needed. This construction enhances the dissipation of thermal energy in the unit while at the same time maximizing the power output density. The air gap is preferably provided with an axial spacer having a series of radially oriented openings which open the air gap over approximately 85% of the surface area of the spacer's circumferential section to allow cooling air into the warmest part of the alternator. Arrow 53 indicates the entrance of cooling air into the alternator interior radially flowing through the stator in contrast to the prior art where the air flows only longitudinally in this section.

The air entering radially through the stator may flow through the gap between the rotor and the stator. The wound field rotor section may also be provided with air flow openings that are axially aligned and correspond to the air flow passages 50 in the permanent magnet section. Air drawn into the center of the alternator through the stator core flows across critical sections of the stator coil, sections of wound field coils and diodes as well as through the permanent magnet section.

In addition to decreasing the temperature of the alternator and increasing air flow, by providing air flow openings in the stator core spacer and in the rotor sections, the total weight of the alternator is significantly reduced. The air flow openings in the regions referred to are located in sections of the alternator which do not carry significant magnetic flux. Consequently adding these openings and air flow holes does not diminish the electrical output of the alternator or affect its efficiency.

In contrast, the current state of the art Lundell or claw pole geometry alternators do not allow anything more than double end ventilation. It is not possible to ventilate through the mid section of the stator core nor is there an opportunity to ventilate through the rotor area because the Lundell and claw pole construction is a relatively solid mass construction with no voids or areas that could be devoted to the air flow.

By providing additional parallel air flow paths, cooling fans in the alternator do not need to develop as much of a pressure differential to cause a given volume of air to flow. This reduces overall alternator noise and/or permits fan blade diameter and blade design to be altered to reduce the total size of the alternator.

The air flow is particularly valuable in keeping the temperature of the permanent magnets as low as possible under all conditions of operation. This enhances the output of the alternator and minimizes the risk of demagnetization at high temperatures. This allows the alternator to be rated at the highest possible output in the high temperature conditions that exist under the hood of modern automobiles.

Voltage Regulation—Basic Two State PWM Regulator

In order to maintain a desired constant output voltage from the alternator, it is necessary to feed a forward or reverse excitation current into the rotor winding 28 which varies in a manner similar to that shown in FIG. 5. FIG. 4 illustrates a rotor excitation circuit appropriate for achieving this objective. The rectified output 64 from the stator is compared to a reference voltage 80 in a summing circuit 82 which subtracts the reference voltage 80 from the output voltage 64 and provides an error signal on line 84 to function generator 86.

The function generator controls modulator 88 which provides a forward excitation current to field winding 28 through the slip rings 30, 32 whenever the output voltage 64 is below the reference voltage 80. Typically, the reference voltage is set to the desired charging voltage for battery 62. The function generator provides a reverse excitation current to field winding 28 whenever the output voltage 64 rises above the reference voltage 80

Function generator 86 and modulator 88 may simply provide a steady forward or reverse excitation current in the amount needed to produce the desired output and linearly reduce the error signal 84 to zero. However, it is only necessary for the average current to approximate the desired levels, and so a preferred method is to use pulses to adjust the average current through rotor winding 28. Pulses of a positive polarity cause a forward current to be supplied and pulses of a reverse polarity cause a reverse current to be supplied. The width of the pulses is varied to vary the average current. This provides an electrically efficient circuit design to provide the varying current. This constitutes the basic two state pulse width modulation (PWM) voltage regulator circuit that alternately switches directly between the forward and reverse polarity modes.

Voltage Regulation—Dual Voltage Alternator

The rotor excitation circuit comprising elements 80–88 provides a constant output voltage at 64 to supply electrical circuits and charge battery 62. If the alternator is to be a single voltage alternator, this is sufficient. If the alternator is to be a dual output voltage alternator, then typically one of two alternative designs will be used. In the simplest design, the stator will be provided with a second winding as previously mentioned. The error signal 84 may be based upon the output from only one of the two stator windings, with the second output permitted to seek its own level as the first is regulated.

Alternatively, an error signal which is a function of the output voltage from both windings may be used so that neither output is fully regulated, but both are held approximately to the desired level set by the composite error signal.

However, FIG. 4 illustrates a preferred alternative design for a dual output voltage alternator according to the invention. In this design, the alternator is principally a single output voltage alternator producing a constant voltage at output 64 for battery 62 which is the higher voltage battery.

Instead of producing the second voltage from a second winding, it is provided by a voltage converter circuit 90. In a manner similar to that described for the excitation circuit above, a reference voltage 94 is summed with an output voltage 96 connected to the second battery 92 in a summing circuit 98 to produce an error signal on line 100.

A function generator 102 controls a modulator 104. Modulator 104 generates a series of pulses to turn switch 106 on and off in a switching power supply design. The switching power supply is conventional and produces a voltage regulated output which is filtered with capacitor 108 and coil 110.

The voltage source for the switching regulator must be higher than its output voltage and may be connected either to output 64 over line 114 or directly to the stator windings 16 over dashed line 116.

Generally, one source or the other would be selected and the connection would be made permanently over line 114 or 116 instead of through a switch 118.

Hybrid Alternator—Axially Magnetized Permanent Magnet

Figure 6:
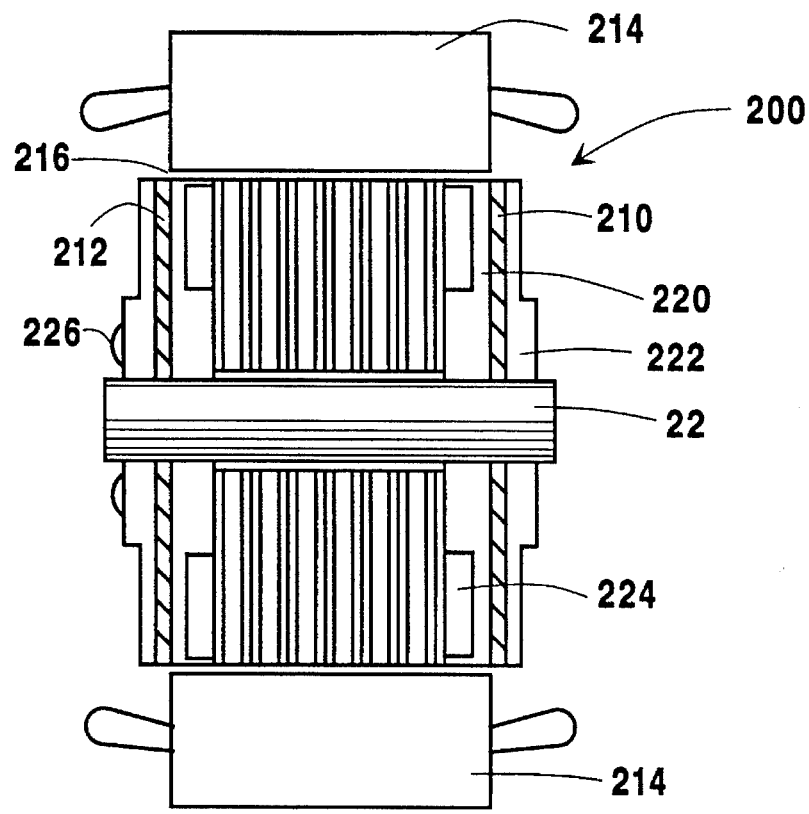
FIG. 6 is a cross sectional view taken parallel to the rotor shaft of a first alternative embodiment of the invention employing a solid disk-shaped permanent magnet.

FIG. 6 shows a first alternative embodiment of the alternator generally indicated at 200, employing a pair of solid disk-shaped permanent magnets 210, 212 magnetized with multiple poles. The disk may be made of a bonded permanent magnet material. The stator 214 is essentially similar to the stator 14 described in connection with the previous embodiment, and, accordingly, is shown only in outline form. It generally will include a three phase winding wound into the slots in a laminated or cast stator made of a good grade of electrical steel. Dual windings may be used in dual voltage output designs, if desired.

Stator air gaps corresponding to stator air gap 52, described previously, may be introduced on either side of the wound field rotor portion to isolate the permanent magnet portion of the stator from the wound field portion. A single permanent magnet portion may be used similar to the design described in connection with FIGS. 1–3 or two permanent magnet portions longitudinally separated on opposite sides of the wound field rotor portion may be used as shown in the embodiment of FIG. 6.

Figure 7:
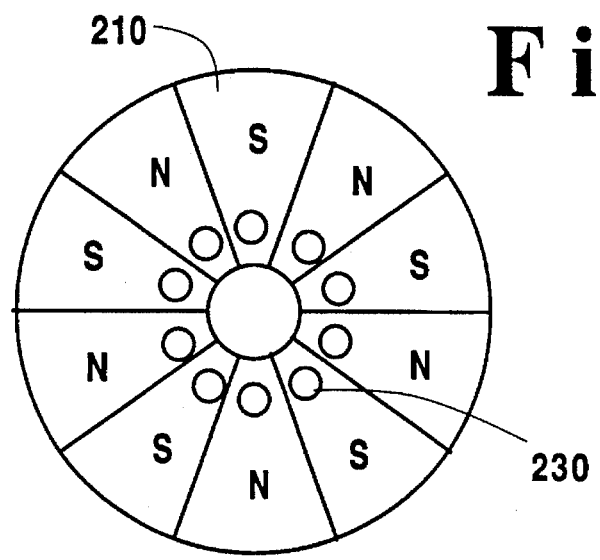
FIG. 7 is a side elevational view of a ten pole disk-shaped permanent magnet used in the first alternative embodiment of the invention shown in FIG. 6.

The solid disk permanent magnet element is shown separately in FIG. 7. It could be made of separate permanent magnet elements, but is preferably made as a single piece, magnetized through its thickness, in a longitudinal direction, parallel to the shaft when assembled. This is 90° C. (ninety degrees) to the direction of magnetization of the permanent magnets shown in FIGS. 1 and 3 where the magnetization is radially oriented instead of longitudinally.

Figure 8:
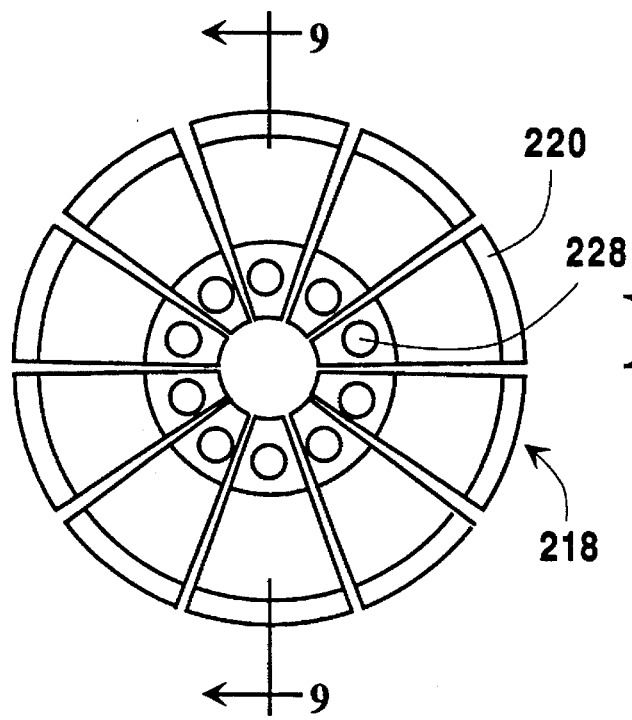
FIG. 8 is a front elevational view of a segmented flux channeling element used in the first alternative embodiment of the invention shown in FIG. 6.
Figure 9:
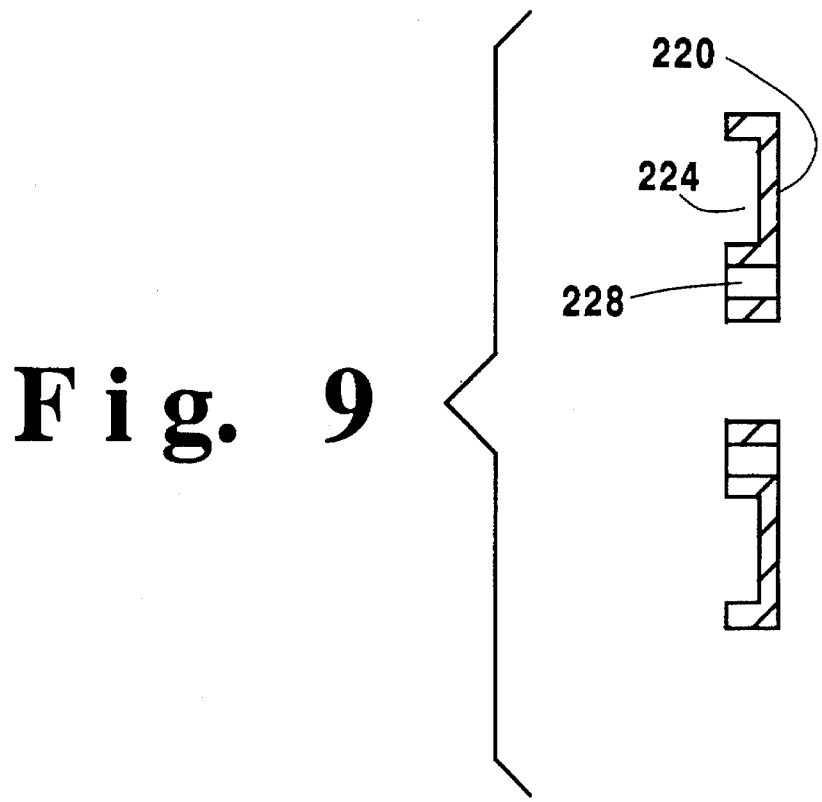
FIG. 9 is a cross sectional view of the segmented flux channeling element along the line 9—9 shown in FIG. 8.

In order to generate electricity, the field lines of the rotor must penetrate the air gap 216 between the rotor and the stator and cut the stator windings. With the magnetic field turned longitudinally, the magnetic flux must be turned and directed up to the air gap. This is accomplished with a flux channeling element generally indicated with reference numeral 218 made up of multiple pole segments 220 as shown in FIGS. 8 and 9. Individual pole segments 220 carry the flux from the permanent magnet disk 210 up to the air gap 216 to penetrate the stator windings. A second flux channeling element comprises a flux return plate 222. Two flux return plates are used, located at the end faces of the rotor, one for each magnetic disk.

By forming the permanent magnet in a solid disk and rotating the direction of magnetization, improved mechanical strength is achieved and greater magnet size and surface areas results. This provides for an inherently strong design and allows the magnetic flux exiting the large face areas of the disk to be concentrated as it is channeled up to the air gap by the pole segments 220.

In the preferred configuration of this embodiment, the pole segment pieces 220 are shaped with openings 224 which wrap around the winding extensions in the wound rotor. This shape give added strength to the windings and allows very high rotational speeds to be achieved without damage to the rotor.

The end pieces 222, permanent magnet disks 210, pole segment pieces 220 and the wound rotor section are held together by rivets 226 extending through holes 228 and 230 in the segment pieces and magnetic disk respectively.

The rotor components of FIG. 6 are mounted on shaft 22 in a manner identical to that shown in FIG. 1. Shaft 22 will be journaled in a housing and have slip rings contacted by brushes for supplying current to the wound field rotor section. Voltage output and regulation is identical to that described previously.

Hybrid Alternator—Circumferentially Magnetized Permanent Magnet

Figure 10:
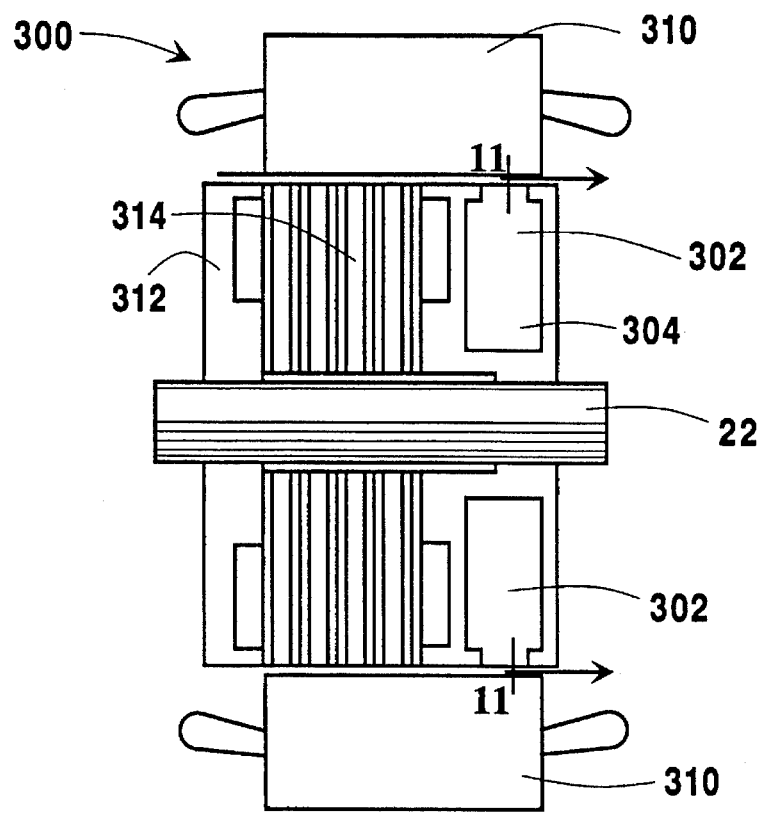
FIG. 10 is a cross sectional view of a second alternative embodiment of the invention using embedded permanent magnets.
Figure 11:
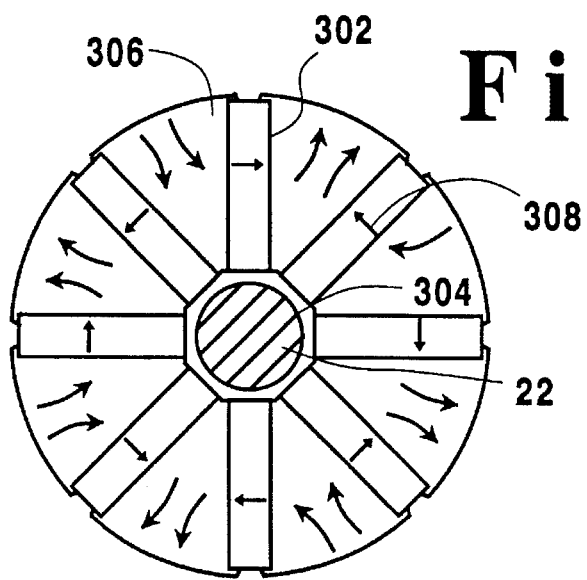
FIG. 11 is a cross sectional view along the line 11—11 in FIG. 10 showing the embedded permanent magnet portion of the rotor.

Yet another embodiment of the invention is shown in FIGS. 10 and 11 and generally indicated with reference numeral 300. In this embodiment, permanent magnets 302 are embedded in a retainer 304, formed of a non-magnetic material such as aluminum, which forms a hub around the rotor shaft 22. The retainer isolates the magnets magnetically from the hub and holds them securely.

As in each of the previous two designs, the permanent magnets 302 are magnetized through their thickness. However, they are mounted with the direction of magnetization oriented in yet a third direction, in this case circumferentially relative to the shaft. The embedded magnets in FIG. 11 are inserted into the non-magnetic retainer with alternate orientations between flux channeling elements 306 located circumferentially adjacent to and between the magnets 302. The flux channeling elements 306 are made of a material that has high magnetic permeability. They direct the magnetic flux, as indicated by arrows 308 from the magnets to the air gap between the rotor and stator.

This design like the design described in connection with FIGS. 6–9 permits a relatively large amount of permanent magnet material to be used in a small space, with the flux being concentrated at the rotor perimeter. In some applications, this allows the use of less expensive permanent magnets which reduces cost. In other applications using high energy magnets, the design in FIGS. 1–3 may be preferred.

The stator 310 will be substantially identical to the stator described in connection with FIGS. 1–3. A non-magnetic end cap 312 provides support for the wound field rotor extensions in the wound field portion 314. A similar end cap for the rotor windings may be incorporated into the magnet retainer as shown, or may be formed as a separate piece. It should be noted that while this end cap piece is similar in appearance to the magnetic material piece 220, in FIG. 6, it is formed of a non-magnetic material in this design and of a magnetically permeable material in FIG. 6.

Voltage Regulator—Three State Design

Figure 12:
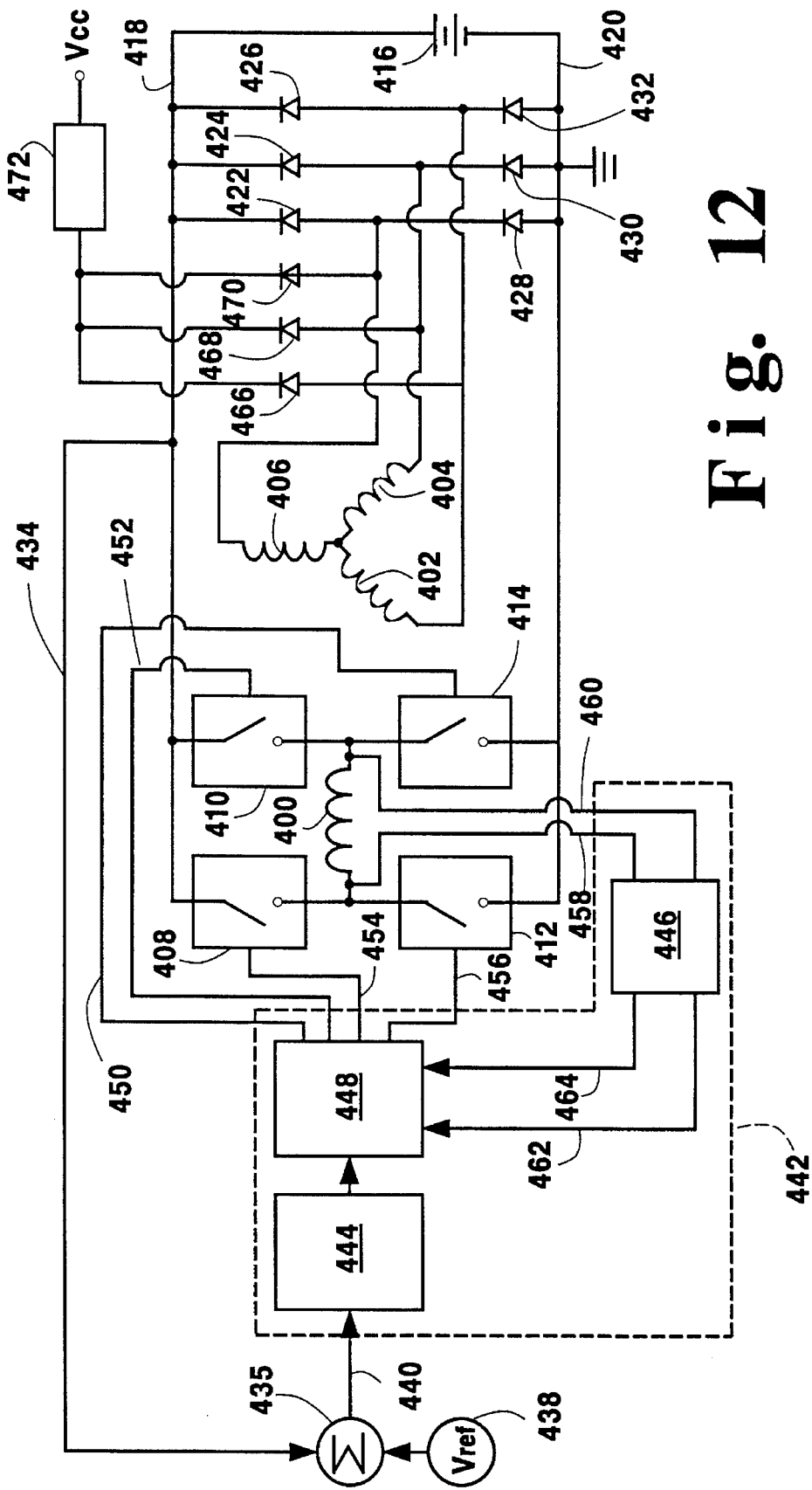
FIG. 12 is a block diagram of a voltage regulator for a bridge circuit controlled rotor winding of a hybrid alternator.

FIG. 12 illustrates a block diagram of a first preferred embodiment of a bridge circuit type of three state voltage regulator. The voltage regulator controls bidirectional current flow through a winding 400 on the rotor of a hybrid alternator of a type previously described. The regulator may also be used with other types of alternators of devices requiring three state control. The rotor winding 400 in combination with the permanent magnet portion of the rotor induces a flux in the stator winding 402, 404, 406 of the hybrid alternator.

Bidirectional current flow is achieved through the use of four switches 408, 410, 412 and 414 arranged in a bridge configuration to form a switching circuit. A first upper switch 408 is connected to a first end of the winding 400 and forms with a first lower switch 414 a first pair of switches. When these switches are closed, the first end of the rotor winding 400 is connected to the positive end of the battery 416 over the positive bus 418 and the second end of the rotor winding 400 is connected to the negative end of the battery 416 over the ground 420. When the first pair of switches 408, 414 are closed, the voltage regulator said to be in the forward polarity mode or in the boosting mode, and forward current flows from the first end of the rotor winding 400, connected to switch 408, to the second end of the rotor winding 100, connected to switch 414.

A second upper switch 410 forms with a second lower switch 412 a second pair of switches. When the second pair of switches is closed, a second end of the rotor winding 400 is connected to the positive bus 418 and the first end is connected to the ground 420. In this configuration the voltage regulator is said to be in the reverse polarity mode or the bucking mode. Control logic is provided to make these modes mutually winding 400 is wound on to the rotor so that in the forward polarity mode the magnetic flux produced by forward current flow is added to the magnetic flux provided by the permanent magnet section of the rotor.

Conversely in the reverse polarity mode, a reverse current flow through the rotor winding 400 will generate magnetic flux of the opposite polarity which is subtractively combined with the magnetic flux from the permanent magnets.

In order to regulate the output of the hybrid alternator, the prior art has simply switched the rotor winding 400 between forward and reverse polarity modes as described in the basic PWM regulator above. A voltage regulator which operates in only these two modes may be referred to as a two state PWM voltage regulator. The voltage regulator is switched into the forward polarity mode whenever it desired to increase the output and is switched into the reverse polarity mode whenever it is desired to decrease the output.

As discussed above, however, when a forward current has been induced into the rotor winding 400 through switches 408 and 414, considerable energy is stored in the magnetic field produced by coil 400. If the first pair of switches 408 and 414 are immediately opened and the second pair of switches 410, 412 are immediately closed, the forward current induced in the forward polarity mode will continue to flow as the magnetic field from rotor winding 400 slowly collapses. Under certain conditions, this forward field current will continue to flow as reverse current through the second upper switch 410 and in lower switch 412. It will also appear as a reverse current on the positive bus 418. If the net loads on the bus are low, and provided that battery 416 is connected, this reverse current normally enters the battery and charges it slightly. However, in the absence of a battery or other conditions likely to occur, a large voltage spike will be produced which may damage the vehicle components.

These spikes and other spikes produced as a result of changing loads on the electrical system of the vehicle could be handled by placing a capacitor across the terminals of the battery 416 from the positive bus 418 to ground 420. However, a capacitor of sufficient size with a temperature rating suitable for operation under the hood of a vehicle would be expensive.

Accordingly, the preferred embodiment of the voltage regulator employs a configuration which may be referred a three state voltage regulator design. In this construction, the voltage regulator employs a normal forward polarity mode for starting the flow of a forward current in winding 400 or for increasing an existing forward current flow. The reverse polarity mode is used for starting a reverse current flow or increasing the magnitude of the reverse current flow. The third mode, referred to here as a decay mode, is entered after the voltage regulator leaves the forward or reverse polarity mode.

In the decay mode (which might also be considered a zero voltage or zero polarity mode), current induced in either of the two other modes is permitted to circulate through the rotor winding and decay towards zero without inducing any damaging voltages in the remainder of the circuit. The decay is entered after either of the other two modes whenever the decay current is present to prevent a direct transition from the forward polarity mode to the reverse polarity mode, or the opposite transition which would result in reverse current being applied to the main power bus.

Those familiar with four element bridge circuits, for example full wave, bridge rectifiers and the like, will recognize that in the conventional use of bridge circuits opposite pairs of elements are intended to conduct simultaneously. Thus, the first pair of switches conduct in one state and the second pair of switches conduct in the second state. In this three state design, two elements that are directly opposite to one another (instead of diagonally opposite to one another) are opened simultaneously and current is allowed to flow through the remaining two elements in a circulating decay current pattern.

For example, in the forward polarity mode, switches 408 and 414 are closed. In the decay mode, switch 408 is opened while switch 414 remains closed. In some implementations of the invention, switch 412 would be closed at this time to provide a conducting path in the forward direction down through the first lower switch 414 and back up in a reverse direction through second lower switch 412. As discussed more fully below, however, switches 412 and 414 are semiconductor switches, preferably field effect transistors which have the property that they can conduct in the reverse mode through an internal diode without applying a control signal to close the switch. This internal diode generates a voltage drop when reverse current flow is occurring which is used to detect the present of decay current.

The decay mode may also be implemented by allowing the decay current to flow through upper switches 408 and 410.

Continuing to refer to FIG. 12, the voltage produced by the combined effect of the magnetic flux from the rotor 400 and the permanent magnets on the rotor is generated by the stator windings 402, 404 and 406 and is rectified in a conventional three phase full wave bridge rectifier composed of six diodes 422, 424, 426, 428, 430 and 432. These six diodes correspond to diodes 60 in FIG. 4. The rectified output is fed to the battery 416 over the positive power bus 418 and also feeds the electrical load of the vehicle over a connection (not shown) to the power bus 418.

The output voltage of the alternator is monitored over wire 434 by a voltage monitoring circuit 436. The voltage monitoring circuit compares the output voltage of the alternator to a reference voltage from the voltage reference circuit 438 and produces an error signal on line 440.

The error signal 440 is applied to the input of control circuit 442. The control circuit 442 includes a primary circuit 444, a decay current detecting circuit 446 and logic circuit 448. The primary circuit is directly responsive to the error signal of the monitoring circuit over line 440 and produces one or more primary control signals that signal the logic circuit 448 to increase or decrease the output of the alternator.

In the basic two state PWM regulator, the primary control signal would have been used to turn on the first pair of switches when an increased output was desired and to turn on the second pair of switches when a decreased output was desired.

In the present invention however, the primary control signals are modified in the logic circuit 448 with information obtained from the decay current detecting circuit 446 before secondary control signals are produced. The secondary control signals control the states of the switches 408, 410, 412 and 414 individually over control lines 450, 452, 454 and 456.

The decay current detecting circuit 446 is connected to monitor the decay current in rotor winding 400. In the preferred design this monitoring is conveniently done by connections 458 and 460 between the decay current detecting circuit 446 and the first and seconds ends of the winding 400. The decay circuit detecting circuit 446 produces one or more inhibiting signals which are applied to inputs of the logic circuit 448 over lines 462, and 464. Those familiar with the art will recognize that there are other ways to monitor the decay current in winding 400.

Automatic Interlock and Internal Voltage Regulator Power Supply

Three additional diodes 466, 468 and 470 provide independent power to an internal power supply 472 producing $V_{cc}$ power. The internal power supply 472 supplies power for operating the voltage regulator circuitry. This voltage is regulated to provide the control voltage power supply for the regulator. Since the hybrid alternator contains both a permanent magnet and wound field, the alternator begins to generate a voltage as soon as it begins turning. As the voltage becomes larger it generates enough voltage to power the electronics so that additional boost field can be generated. All of this occurs even before the vehicle reaches idling speed, so that at idle, the voltage regulator is functioning properly.

Operating the system in this manner provides an automatic interlock so that the voltage regulator loop is disconnected and draws almost zero field and control current when the alternator is not turning, but automatically connects the voltage regulator electronics as the alternator speeds up.

An automatic interlock is very important in a hybrid alternator because the field current should never be shut down when the system is operating at high speeds as severe overvoltages and overcurrents will occur. This is in distinct contrast to present alternators which allow the ignition switch to turn off the voltage regulator field. It is important that the alternator field current be zero when the vehicle is not operating and the engine is off to avoid battery drain, but this should not be done with the ignition key alone. This is because the ignition could accidentally be turned off when the alternator is operating at high speed.

Figure 13:
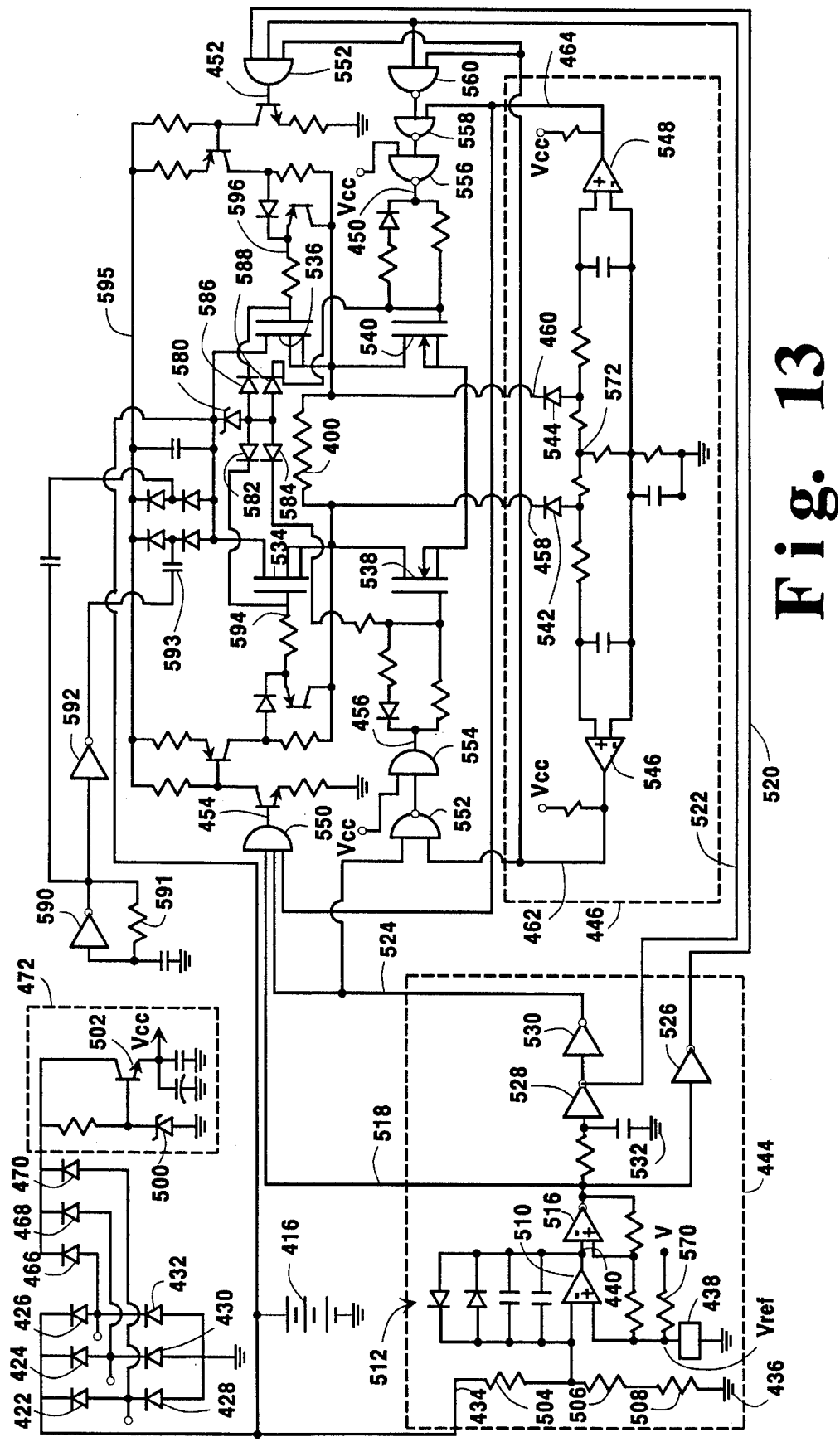
FIG. 13 is a detailed circuit diagram of a circuit in accordance with the block diagram of FIG. 12.

FIG. 13 is a detailed schematic circuit diagram corresponding to the block diagram of FIG. 12. Battery 416 is connected to the six (6) bridge rectifier output diodes 422–432 which are connected in turn to the stator windings 402, 404 and 406 in the manner illustrated in FIG. 12. The stator windings 402, 404 and 406 are not shown in FIG. 13, but their connection is entirely conventional.

The internal power supply 472 comprises a zener diode 500 regulating the output voltage $V_{cc}$ of an NPN transistor 502. Three terminal voltage regulating devices and other voltage regulating circuits would also be suitable.

The voltage monitoring circuit 436 monitors the battery voltage 416 over wire 434 which produces a voltage drop across the resistor bridge 504, 506 and 508. Resistor 506 is made adjustable to adjust the output voltage of the regulator. The scaled output voltage of the alternator is compared in error amplifier 510 with the reference voltage from the voltage reference circuit 438.

The voltage monitoring circuit performs error amplification and loop compensation. The reference voltage from reference voltage source 438 is applied to one input of error amplifier 510 and the other input is connected to a voltage divider from the battery. Integral compensation is provided by the capacitive nature of the feedback network between the inverting input of the error amplifier 510 and the output. The compensating network is generally indicated with reference arrow 512. This network eliminates DC error in the regulator voltage over the complete range of speed and load on the alternator.

The output of the error amplifier is an amplified error signal on line 440 which is provided to the primary circuit section 444 of the control circuit 442. The error signal is applied to the input of a simple hysteresis block formed by a hysteresis inverter 516 which acts as a two state modulator. When the alternator output is too high, the error signal 440 will be lower and the output of the hysteresis inverter 516 will switch high. This high signal always causes the net field in the alternator to be decreasing. Alternately, when 516 is low the net field in the alternator is increasing.

The primary circuit 444 produces four primary control signals on lines 518, 520, 522 and 524. The primary control signal on line 518 is taken directly from the output of the two state modulator 516 and the primary control signal on line 520 is the inverted opposite of that signal. Primary control signal 520 is produced by the inverter 526. The control signals on lines 518 and 520 could be used to drive the diagonally opposite switch pairs of the switching bridge in a two state basic PWM regulator design. They serve as the starting point for the modified control shown here that results in the secondary control signals that actually perform the desired switching.

The hysteresis in the inverter 516 in combination with the gain and dynamics of the error amplifier block 436 controls the voltage error and sets the natural oscillation frequency of the loop. The function of the primary inverter 516 could also be performed by a pulse width modulator with a ramp oscillator and corresponding components, however such a design would be more complex and more expensive than the simple digital circuitry shown in FIG. 13.

The primary control signals on lines 518 and 520 are accompanied by delayed copies of the primary control signals on lines 522 and 524 which are generated by inverters 528 and 530. The output from hysteresis inverter 516 is delayed in a simple resistor capacitor delay generally indicated with reference arrow 532. Thus, primary control line 522 carries a delayed version of the primary control signal of line 520. Line 524 carries a delayed version of the primary control signal on line 518. The primary control signals on lines 518 and 520 are used to provide inputs to the logic circuit 448 which ultimately produces the secondary control signals for switching the switches directing current through the winding 400.

Switching elements 408, 410, 412 and 414 in FIG. 12 correspond to field effect transistors (FETs) 534, 536 and 538 and 540 with their associated drive electronics in FIG. 13. When FET 534, corresponding to the first upper switch, and FET 540, corresponding to the first lower switch, are on, the alternator is said to be in the forward polarity mode. When FETs 536 and 538 are on, the alternator is said to be in the reverse polarity mode. The alternator may be said to be in the decay mode whenever both of the upper FETs are off or both of the lower FFTs are off indicating that no voltage is being applied to the winding 400 from the battery or alternator output.

Different implementations of the invention may turn off both upper switches to disconnect the winding 400 from the battery or both lower switches may be turned off. With additional components other configurations for applying zero voltage to the winding 400 may be employed.

In addition to disconnecting the winding 400 from the battery, the winding must be connected so that the current can decay without inducing damaging voltages in the remaining circuitry of the voltage regulator or elsewhere in the automobile. This is accomplished by allowing the decay current to recirculate through two of the switches connected to opposite ends of winding 400. In the preferred design shown in FIG. 13, the recirculating circuit is carried through the lower two FETs. However, the recirculating current could alternatively be carried in the upper two FETs or through other components.

Both FETs 538 and 540 could be turned on to carry the recirculating circuit however the FETs have an internal diode which will permit them to carry a reverse current even when they are not biased on. When left off, the recirculating decay current induces a voltage across the internal diode of the lower FET which is sensed by the decay current detecting circuit 446 over lines 458 and 460 connected to the first and second ends of the winding 400.

Diodes 542 and 544 isolate comparators 546 and 548 from the FETs whenever the drain of the FET is high during the forward or reverse polarity mode. One side of the comparators 546 and 548 has a voltage reference obtained from a voltage divider and the voltage reference source 438 $V_{ref}$ and the other side has a filtered version of a voltage which is one diode drop above the FET drain voltage when it is near ground. Diode 542 and 544 raise the voltage level by one diode voltage drop so that no negative voltages are needed on the inputs of comparators 546 and 548.

The logic circuit 448 is implemented in FIG. 13 with logic gates 550, 552, 554, 556, 558, 560 and 562. The logic circuit implemented in these gates accepts the primary control signals and inhibiting signals over lines 462 and 464 from the decay current detecting circuit 446 to produce the secondary control signals on lines 450, 452, 454, 456.

When a secondary control signal such as the secondary control signal 454 switches high, its associated FET, e.g. FET 534 turns on. The logic function performed by gates 550, 552 and 554 is identical to the logic function performed by gates 556, 558, 560, and 562. Different logic elements are used to implement the same logic function in order to reduce component count which can be implemented on only two logic chips. Logic gates 550 and 562 control the upper FETs 534 and 536 respectively.

Logic gate 550 is a triple input AND gate. Its output is high and the corresponding FET 534 is on only when all three inputs to the triple input AND gate are high. These three inputs are the primary undelayed PWM control signal on line 518, the delayed primary control signal PWM on line 524 and the inhibiting signal on line 464 from the decay current monitoring circuit monitoring reverse current in FET 540.

The presence of the inhibiting signal on line 464 indicates the presence of reverse decay current in the winding 400 as a result of a decaying current originally induced in the reverse polarity mode. The inhibiting signal on 464 is holding the second lower FET 538 on and inhibiting FET 534 immediately above it from being switched on at the same time. Once the current induced in the reverse polarity mode decays to a sufficiently small value, the inhibiting signal on 464 switches state allowing the circuit to change modes.

Although the voltage exciting the field winding has three modes namely the forward polarity mode, the reverse polarity mode and the decay mode, the FETs actually have four different states. In the forward polarity mode FET 534 and 540 conduct. In the reverse polarity mode FETs 536 and 538 conduct. In the decay mode (two states), both FETs 534 and 536 are off.

The decay mode has two different states, a forward decay mode and a reverse decay mode. In the forward decay mode, the current induced in the forward polarity mode is allowed to decay and FET 540 is held on with FET 538 remaining off, but conducting through its internal diode. In the forward decay mode, the decay current continues to flow through the winding 400 in the same direction as its flows when in the forward polarity mode. In the reverse decay mode, FET 538 is on and FET 540 is off, but conducting through its internal diode with reverse current circulating through the winding 400 down through FET 538 and back up through FET 540.

The present invention utilizes a bridge circuit arrangement to provide bilateral voltage excitation of the winding 400. The voltage monitoring circuit 436 provides basic error amplification to produce the error signal on line 440. The voltage regulation loop contains a compensation block to shape the loop frequency response to provide for tight control of the average battery voltage. The compensated amplifier output error signal on line 440 drives a pulse width modulator, or other two state modulator, which indirectly drives a full bridge output stage to provide the bidirectional current through winding 400 which is connected across the center taps of the bridge.

Logic circuit 448 modifies the output of primary circuit 444 to allow a third state of voltage excitation of near zero voltage applied to the winding 400 whenever the field current magnitude is being increased. Primary control signals from primary circuit 444 act to directly turn on the diagonally located pair of bridge switches. However a zero voltage excitation is employed whenever the magnitude of the field current is to decrease.

When the field current's instantaneous magnitude is being commanded to increase by the primary control signals from 444, full bus voltage of appropriate polarity is applied to the field coil by exciting the appropriate diagonal pair of bridge elements. However, when the field current magnitude is being reduced, only the upper switch in the previously conducting diagonal pair of switches is turned off. By utilizing a delay in the turn off of the lower diagonal switch and turn on delays in the opposite diagonal switches, the inductive field current that was flowing in the upper switch transfers to negative current in the switch element immediately below the one being turned off.

Current flow in the lower diagonal switch continues due to the previously described delay in its turn off. Its lower diagonal switch is then commanded to remain on by the presence of reverse current in the other lower switch. When the reverse conducting power switch is an FET, as shown in the preferred embodiment of FIG. 13, and when that switch has a delayed turn on, the reverse current first flows through the FET's intrinsic diode generating a voltage drop of about −0.6 voltages. If the lower reverse conducting FET were turned on, the reverse circulating current would also flow through FET on resistance leading to a lower voltage drop.

As described above in the preferred implementation of this invention this FET is kept off during the decaying current in order to allow the voltage across the FET's intrinsic diode to provide a simple indicator of the presence of decaying field current. The nonlinear diode characteristic provides a reasonable voltage level even for small currents. This allows the use of a simple voltage comparator in the form of comparators 546 and 548, to indicate the presence of field current. When the intrinsic diode voltage is more negative than a threshold set by reference voltage source 438 and the resistor divider below that point, the presence of reverse current is indicated.

When the comparator indicates the presence of field current in the reverse conducting switch, the drives to the opposite diagonal elements are inhibited by the comparator signal and drive to the lower FET which is conducting the decaying field current is kept on. After the comparator indicates near zero field current, it is safe to excite the opposite diagonal bridge elements as commanded by the primary control signals of the primary circuit 444. Switching the new diagonal pair on at zero field current will not introduce any negative current into the bus and therefore causes no harmful voltage spikes if the battery becomes disconnected or the system is lightly loaded.

Control Logic and Method of Three State Regulation

The primary control loop contains the voltage monitoring circuit 436 monitoring the output on line 434 and includes an error amplifier operating on the difference between the battery voltage and the reference 438. The amplified error signal drives a pulse width modulator, or other two state modulator, incorporated in primary circuit 444 to produce the primary control signals, which include the PWM signal at the output of the two state modulator, the inverted PWM signal and delayed copies of those two signals. The primary PWM control signal switches between the on state and the off state. During the on state it is set to turn on one diagonal pair and the opposite diagonal pair during the off state and vice versa. Because of the two state basic step up, digital logic is preferred for implementing the control system.

The actual switch commands are modified by delays, inhibits and other signals to produce a more complex switching structure and avoid negative bus current as described below.

When increasing the instantaneous magnitude of field current through the winding 400, the appropriate diagonal bridge pair is fully on. However, to avoid negative current steps into the bus, the bridge operates to let the field current decay naturally in a circulating current loop containing only the lower switches rather than forcing a more rapid decay with reverse excitation from the bus. To set up this natural decay, both the upper bridge elements are off and the decaying field current circulates in the lower bridge elements. One lower bridge element conducts in a forward direction while the other conducts in reverse. This natural decay continues until the two state modulator, corresponding to hysteresis inverter 516, changes state again or the field current goes to zero.

In the first case, the originally conducting pair comes on again. In the latter case, when the field current reaches zero, the opposite diagonal pair comes on. The natural decay feature is performed by inhibiting the turn on of the new diagonal pair until the decay current has approximately reached zero. Overall operation in the preferred design is thus multiple state with four states of operation of the output switches taking place or three states of instantaneous voltage across the field winding if the switch device drops are neglected. The three states of instantaneous field winding voltage are plus battery voltage, zero voltage and minus battery voltage.

The preferred method of operation of the invention employs the following steps:

(1) the on upper device turns off immediately in response to an undelayed PWM off command, (2) the turn off of the lower elements is delayed and all bridge element turn ons are delayed an equal or longer time allowing circulating current in the lower bridge elements to automatically take place when the upper device turns off, (3) threshold comparators on each lower switch indicate the presence of reverse current (decaying field current) in that device and that logic signal is used to perform the following steps:

a) The FET drive on the reverse conducting switch is inhibited to avoid interfering with the threshold voltage measurement;

b) The turn off drive on the new upper diagonal switch is inhibited because the switch below it will be on for the circulating decay current;

c) The drive on the other lower FET will be forced to remain on to carry the decaying circulating current;

d) If the primary control signals return to their original state before the field current goes to zero, the original diagonal pair of output devices will come back on and the magnitude of field current begins to increase again. This is the normal mode of operation when operating at constant speed and fixed loads. The system will operate between driving the field winding with the bus voltage in one state and having the field decay with circulating currents in the lower FETs for the other state. This full drive voltage followed by zero drive voltage operates in the same manner independent of the direction of the average field current. Thus, in normal operation at relatively low alternator speeds, with a fixed load, the alternator will cycle between the forward polarity mode and the decay mode (more specifically, between the forward polarity mode and the forward decay mode). When the alternator is operating at relatively high speeds, the alternator will cycle between the reverse polarity mode and the decay mode (more specifically, between the reverse polarity mode and the reverse decay mode). During these normal cycles between the forward or reverse polarity mode and the decay mode, the primary control signal on line 518 will be alternating between the on and off states.

e) Only when the field current goes to zero before the primary signal on line 518 returns to its original state does the opposite bridge pair come on and the current in the rotor winding 400 change direction. This type of operation will occur if the average field current is near zero or if the alternator speed or load changes abruptly.

Transient Suppression

The voltage regulator illustrated in FIG. 13 incorporates a unique method of suppressing voltage transients, such as those generated in a classic "load dump" situation well known in the automotive industry. Load dump is a situation where a heavy battery load is suddenly switched off or when the battery itself is disconnected while drawing heavy current. In this situation a suppressor device is required to handle the inductive energy stored in the alternator windings. The present voltage regulator uses a signal level zener diode 580 with directing diodes 582, 584, 586 and 588 that turn on the bridge FET diodes so that the bridge FETs can absorb the transient. FET devices are able to handle large power impulses effectively and thus the bridge arrangement when properly controlled in a transient voltage situation allows these devices to perform a dual function.

The remaining transistors and inverters 590 and 592 are drive circuitry which drives the various FETs in the bridge circuit. The upper power FETs 534 and 536 are directly driven with conventional NPN/PNP level translation circuitry. The PNP transistors 594 and 596 nearest the FET gates provide active gate pull down. The FETs are turned on and off relatively slowly with the circuitry shown to minimize interference. The field current modulation can produce current steps in the alternator output ranging between full alternating field current and zero. Since the alternator has a finite output inductance, it cannot change its current instantly. Slower rise and fall times on the power FETs partially alleviate this problem and the voltage clamp arrangement provided by zener diode 580 and its associated diodes 582–588 protects the FETs from reaching their breakdown voltage should be short voltage excursions exceed the clamp voltage. A clamp voltage of about 27 volts is used.

Inverters 590 and 592 are arranged as two charge pump oscillators. The oscillators, with the rectifying and related circuitry generally indicated with arrows 591 and 593 provide a voltage higher than the battery voltage on line 595 for driving the upper power FETs to switch the battery voltage.

Neutral Point Connected Alternator

Figure 14:
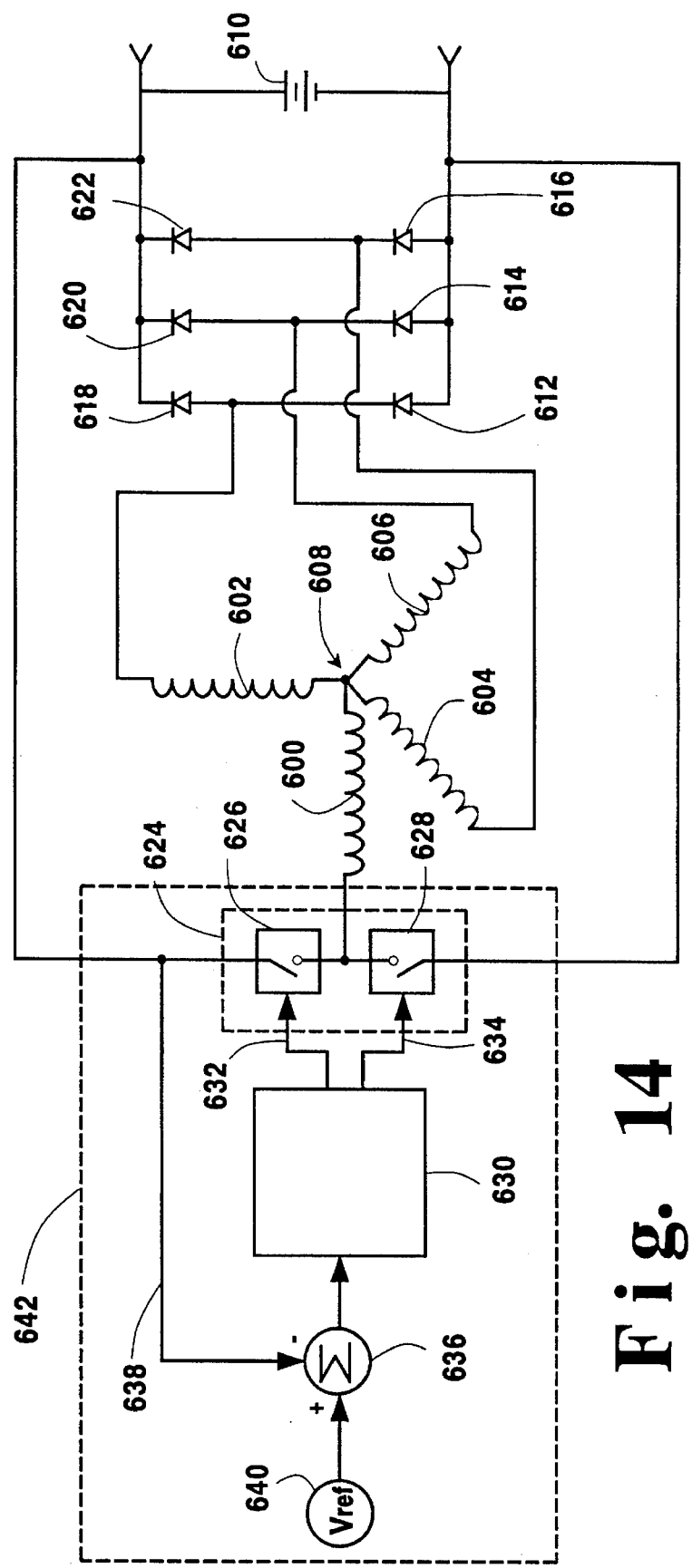
FIG. 14 is a wiring diagram of a novel arrangement for a hybrid alternator in which the rotor winding is connected to the neutral point of the stator winding.

FIG. 14 illustrates a novel wiring arrangement for a hybrid alternator in which the rotor winding 600 is connected to the neutral point connection of the stator windings 602, 604 and 606.

As discussed above, the rotor winding 600 of a hybrid alternator must be supplied with a forward polarity voltage to increase the alternator output voltage and a reverse polarity voltage to decrease the alternator output. This polarity reversal is achieved in the three state voltage regulator shown in FIG. 12 with a bridge circuit which alternately turns on opposite diagonal pairs of switches in a four element bridge circuit. One pair connects the rotor winding between full battery voltage and ground to produce the forward current, and the diagonally opposite pair connects the rotor winding between full battery voltage and ground with the opposite polarity to induce reverse current flow through the winding.

The bridge circuit requires at least four switching elements to accomplish this polarity reversal. In the circuit shown in FIG. 14, however, only two switches are needed. A first end of the rotor winding 600 is connected to the neutral point 608 of the stator winding and the second end is connected to a switching circuit 624 in a voltage regulator 642. The neutral point 608 of the alternator of FIG. 14 is at the center point of the three individual stator windings 602, 604 and 606. Multiphase windings composed of different numbers of individual stator windings connected together at one end to form a star may also be used. The multiphase stator winding is conventionally rectified in a multiphase bridge rectifier composed of diodes 612–622.

Because the neutral point of a star configured stator winding operates at approximately one half the output voltage applied to the battery 610, a forward current can be induced in the rotor winding 600 simply by connecting the opposite end of the rotor winding to the positive end of the battery 610. Alternatively, to induce a negative current in the rotor winding, the opposite end can be connected to ground.

Although the voltage applied to the rotor winding in this configuration is less than the voltage applied in a bridge configuration, the current may be made comparable by adjusting the number of turns and the impedance of the rotor winding to produce the desired magnetic flux.

The switching of the second end of the rotor winding between battery and ground is accomplished with a switching circuit 624 that needs only two switches 626 and 628. The operation of switches 626 and 628 is controlled by a control circuit 630 over primary control lines 632 and 634. Control circuit 630 closes switch 626 and opens switch 628 to apply a forward polarity voltage to the rotor winding 600.

Switch 626 is opened and switch 628 is closed to apply a reverse polarity voltage to the rotor winding 600. By driving the switches in complementary fashion and by using a varying duty cycle from 0 to 100 percent, the average voltage across the field coil can be controlled to range between full boost and full buck to account for various speeds and loads.

During the forward polarity mode, current flows from the battery, through switch 626, through the rotor winding 600 to the neutral point 608 and from there out the individual stator windings 602–606 and bridge diodes 612–622. The specific amounts of current flowing through the specific stator windings and bridge diodes depends on the phase of the alternator and varies as the alternator rotates.

A monitoring circuit 636 monitors the output voltage over line 638 by comparing the output voltage to a reference voltage 640. The voltage regulator 642 is essentially a two state PWM voltage regulator of the basic type previously described. However, instead of using the primary control signals to turn on and off diagonal pairs of switches in a bridge circuit, the primary control signals are used to turn on and off only two individual switches 626 and 628.

In applications where the basic two (2) state PWM control scheme for the voltage regulator is suitable, the reduction in voltage regulator cost due to using only two switches when used with a neutral point connected hybrid alternator will be significant.

The neutral point connected hybrid alternator has a further advantage that the alternator field current automatically goes to zero at zero speed. Thus, the alternator drive does not have to be disabled to turn off alternator current when the ignition is turned off. The control electronics may be designed to consume very little power, and thus may be left continuously on without risk of discharging the battery. In this manner, the neutral point connected hybrid alternator achieves the automatic interlock function previously described in which the regulator is automatically powered when the alternator begins to rotate and automatically unpowered when the alternator stops rotating.

The control circuit 630 may be a simple two state hysteresis amplifier, a simple inverter with hysteresis, a comparator or operational amplifier with feedback to produce hysteresis, a standard pulse width modulator, etc. The neutral point connected rotor winding may also be driven with a linear drive in which the current is smoothly varied between a forward maximum and a reverse maximum using alternative control systems.

Because the rotor winding is rotating and the stator windings are fixed, the field winding to the connection to the neutral point and the switching circuit will be made through slip rings in a conventional way.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

While the invention has been illustrated and described in what are considered to be the most practical and preferred embodiments, it will be recognized that many variations are possible and come within the scope thereof, the appended claims therefore being entitled to a full range of equivalents.

Thus, having described the invention, what is claimed is:

1. A voltage regulator for controlling bidirectional current flow through a winding of an alternator to control an output voltage of the alternator, the voltage regulator comprising:
   a voltage monitoring circuit connected to monitor the output voltage of the alternator, the voltage monitoring circuit producing an error signal indicating that the output voltage of the alternator should be increased or decreased;
   a switching circuit connected to the winding and arranged to connect the winding in multiple modes, including:
      a forward polarity mode in which a forward polarity voltage is applied to the winding,
      a reverse polarity mode in which a reverse polarity voltage is applied to the winding, and
      a decay mode in which current induced in the winding when connected in the forward or reverse polarity mode is permitted to decay without inducing damaging voltages in the voltage regulator; and
   a control circuit connected to the switching circuit, responsive to the error signal of the monitoring circuit, the control circuit controlling the switching circuit to enter the forward polarity mode to increase the output voltage of the alternator, to enter the reverse polarity mode to decrease the output voltage of the alternator and to enter the decay mode whenever switching away from the forward or reverse polarity mode.

2. A voltage regulator for controlling bidirectional current flow through a winding of an alternator according to claim 1 wherein the switching circuit comprises a bridge circuit including:
   a first upper switch connected to a first end of the winding;
   a first lower switch connected to a second end of the winding, the first lower switch forming with the first upper switch a first pair of switches, the control circuit controlling the switching circuit to enter the forward polarity mode by closing the first pair of switches;
   a second upper switch connected to the second end of the winding; and
   a second lower switch connected to the first end of the winding, the second lower switch forming with the second upper switch a second pair of switches, the control circuit controlling the switching circuit to enter the reverse polarity mode by closing the second pair of switches; and
   the control circuit controlling the switching circuit to enter the decay mode by closing the first and second upper switches or by closing the first and second lower switches.

3. A voltage regulator for controlling bidirectional current flow through a winding of an alternator according to claim 2 wherein the control circuit controls the switching circuit to enter the decay mode by closing the first and second upper switches.

4. A voltage regulator for controlling bidirectional current flow through a winding of an alternator according to claim 1 wherein the decay mode comprises:
   a forward decay mode in which current induced in the winding during the forward polarity mode decays; and
   a reverse decay mode in which current induced in the winding during the reverse polarity mode decays;
   and wherein the control circuit controls the switching circuit to enter the forward decay mode when switching away from the forward polarity mode and to enter the reverse decay mode when switching away from the reverse polarity mode.

5. A voltage regulator for controlling bidirectional current flow through a winding of an alternator according to claim 4 wherein:
   the switching circuit comprises a bridge circuit including:
      a first upper switch connected to a first end of the winding;
      a first lower switch connected to a second end of the winding, the first lower switch forming with the first upper switch a first pair of switches, the control circuit controlling the switching circuit to enter the forward polarity mode by closing the first pair of switches;
      a second upper switch connected to the second end of the winding; and
      a second lower switch connected to the first end of the winding, the second lower switch forming with the second upper switch a second pair of switches, the control circuit controlling the switching circuit to enter the reverse polarity mode by closing the second pair of switches;
   the control circuit controlling the switching circuit to leave the forward polarity mode and enter the forward decay mode by opening the first upper switch and leaving the first lower switch closed; and
   the control circuit controlling the switching circuit to leave the reverse polarity mode and enter the reverse decay mode by opening the second upper switch and leaving the second lower switch closed.

6. A voltage regulator for controlling bidirectional current flow through a winding of an alternator according to claim 5 wherein the first and second lower switches of the bridge circuit have the property that they conduct current in one direction only when closed, but conduct current in the opposite direction when open and when closed, the second lower switch being closed and conducting current when the switching circuit is in the forward decay mode and the first lower switch being closed and conducting current when the switching circuit is in the reverse decay mode.

7. A voltage regulator for controlling bidirectional current flow through a winding of an alternator according to claim 6 wherein the first and second lower switches of the bridge circuit are field effect transistors.

8. A voltage regulator for controlling bidirectional current flow through a winding of an alternator according to claim 1 wherein the control circuit further includes a decay current detecting circuit connected to detect the existence of forward and reverse polarity induced current in the winding when the switching circuit is in the decay mode, the decay current detecting circuit producing an inhibiting signal preventing the switching circuit from entering the forward polarity mode when a substantial reverse polarity induced current is in the winding and preventing the switching circuit from entering the reverse polarity mode when a substantial forward polarity induced current is in the winding.

9. A voltage regulator for controlling bidirectional current flow through a winding of an alternator according to claim 8 wherein the switching circuit includes a plurality of semiconductor switches connected to the winding, the decay current detecting circuit detecting the existence of forward and reverse polarity induced current in the winding by detecting a voltage drop across at least one of said semiconductor switches.

10. A voltage regulator for controlling bidirectional current flow through a winding of an alternator according to claim 1 further comprising a transient suppression circuit connected to the switching circuit to absorb a transient voltage spike in the output voltage of the alternator having a voltage in excess of a predetermined voltage.

11. A voltage regulator for controlling bidirectional current flow through a winding of an alternator according to claim 10 wherein:

the switching circuit includes:
- a first upper switch connected to a first end of the winding;
- a first lower switch connected to a second end of the winding, the first lower switch forming with the first upper switch a first pair of switches, the first pair of switches defining the forward polarity mode in which a forward polarity voltage is applied to the winding when the first pair of switches are closed;
- a second upper switch connected to the second end of the winding; and
- a second lower switch connected to the first end of the winding, the second lower switch forming with the second upper switch a second pair of switches, the second pair of switches defining the reverse polarity mode in which a reverse polarity voltage is applied to the winding when the second pair of switches are closed; and the transient suppression circuit is connected to the switching circuit to switch on an upper switch from one of the first and second pairs of switches and a lower switch from the other of the first and second pairs of switches to absorb the transient voltage spike.

12. A voltage regulator for controlling bidirectional current flow through a winding of an alternator according to claim 11 wherein the transient suppression circuit switches on the upper switch and the lower switch from each of the first and second pairs of switches to absorb the transient voltage spike.

13. A voltage regulator for controlling bidirectional current flow through a winding of an alternator according to claim 11 wherein the transient suppression circuit includes:
- a zener diode connected to detect the transient voltage spike; and
- a plurality of directing diodes connected to the zener diode and to the switches to turn on the switches when a transient voltage spike is detected.

14. A voltage regulator for controlling bidirectional current flow through a winding of an alternator according to claim 13 wherein the plurality of directing diodes comprise a corresponding directing diode for each switch in the switching circuit, and the transient suppression circuit switches on the upper switch and the lower switch from each of the first and second pairs of switches.

15. A voltage regulator for controlling bidirectional current flow through a winding of an alternator according to claim 1 further comprising:
- an internal power supply circuit automatically producing an internal power supply output voltage whenever the alternator rotates; and
- the control circuit is connected to and automatically powered by the internal power supply circuit when the alternator begins to rotate to control current flow through the winding of the alternator, and automatically unpowered when the alternator ceases rotation to discontinue current flow through the winding of the alternator.

16. A voltage regulator for controlling bidirectional current flow through a winding of an alternator according to claim 15 wherein the internal power supply circuit includes:
- a voltage rectifier circuit, producing a rectified internal power supply output voltage; and
- an internal power supply voltage regulating circuit connected to the voltage rectifier circuit for regulating the rectified internal power supply output voltage;

the voltage regulator being powered by the regulated internal power supply output voltage.

17. A voltage regulator for controlling bidirectional current flow through a winding of an alternator according to claim 1 adapted to be installed in a vehicle with an ignition switch having an off position wherein the control circuit supplies reverse current flow through the winding of the alternator to maintain a safe alternator output voltage if the ignition switch is switched to the off position with the alternator rotating at a high speed.

18. A voltage regulator for controlling bidirectional current flow through a winding of an alternator according to claim 17 wherein the control circuit is not powered through the ignition switch of the vehicle.

19. A voltage regulator for controlling bidirectional current flow through a winding of an alternator to control an output voltage of the alternator, the voltage regulator comprising:
- means for connecting the winding in a forward polarity mode to apply a forward polarity voltage to the winding and increase the output voltage of the alternator;
- means for connecting the winding in a reverse polarity mode to apply a reverse polarity voltage to the winding and decrease the output voltage of the alternator;
- means for connecting the winding in a decay mode to allow current induced in the winding when connected in the forward or reverse polarity mode to decay.

20. A voltage regulator for controlling bidirectional current flow through a winding of an alternator according to claim 1 wherein:

the voltage monitoring circuit includes:
- a reference voltage source, and a comparator connected to the output voltage of the alternator and the reference voltage source, the comparator producing the error signal indicating that the output voltage of the alternator should be increased or decreased;

the switching circuit includes a plurality of semiconductor switches arranged in a bridge configuration connected to the winding, the semiconductor switches including:
- a first upper switch connected to a first end of the winding;
- a first lower switch connected to a second end of the winding, the first lower switch forming with the first upper switch a first pair of switches, the first pair of switches defining the forward polarity mode in which a forward polarity voltage is applied to the winding when the first pair of switches are closed;
- a second upper switch connected to the second end of the winding; and
- a second lower switch connected to the first end of the winding, the second lower switch forming with the second upper switch a second pair of switches, the second pair of switches defining the reverse polarity mode in which a reverse polarity voltage is applied to the winding when the second pair of switches are closed;

the switches defining the decay mode in which current induced in the winding when connected in the forward or reverse polarity mode is permitted to decay when both of the upper switches or both of the lower switches are open; and the control circuit for controlling the switches of the switching circuit includes:
- a primary circuit connected to the voltage monitoring circuit, the primary circuit producing primary control signals to increase or decrease the output voltage of the alternator responsive to the error signal of the monitoring circuit, a decay current detecting circuit producing an inhibiting signal when the switching circuit is in the decay mode and current is decaying in the winding, and a logic circuit, responsive to the primary control signals and the inhibiting signal, connected to the switching circuit, the logic circuit producing secondary control signals for switching the switching circuit between the forward and reverse polarity modes and the decay mode.

21. A voltage regulator for controlling bidirectional current flow through a winding of an alternator according to claim 20 wherein the primary circuit produces digital primary control signals including:

an undelayed primary control signal, and a delayed primary control signal.

22. A voltage regulator for controlling bidirectional current flow through a winding of an alternator to control an output voltage of the alternator, to the voltage regulator comprising:

a voltage monitoring circuit connected to monitor an output voltage of the alternator, the voltage monitoring circuit producing an error signal indicating that the output voltage of the alternator should be increased or decreased;

a switching circuit including a plurality of switches arranged in a bridge configuration connected to the winding to conduct current through the winding in a forward direction in forward polarity mode to increase the output voltage of the alternator and to conduct current in a reverse direction through the winding in a reverse polarity mode to decrease the output voltage of the alternator the switching circuit including:

a first upper switch connected to a first end of the winding;

a first lower switch connected to a second end of the winding, the first lower switch forming with the first upper switch a first pair of switches, the first pair of switches defining the forward polarity mode in which a forward polarity voltage is applied to the winding when the first pair of switches are closed;

a second upper switch connected to the second end of the winding; and a second lower switch connected to the first end of the winding, the second lower switch forming with the second upper switch a second pair of switches, the second pair of switches defining the reverse polarity mode in which a reverse polarity voltage is applied to the winding when the second pair of switches are closed;

a control circuit connected to the switching circuit to the switch alternator between the forward polarity and reverse polarity modes in response to the error signal; and a transient suppression circuit connected to the switching circuit to switch on an upper switch from one of the first and second pairs of switches and a lower switch from the other of the first and second pairs of switches to absorb a transient voltage spike in the output voltage of the alternator having a voltage in excess of a predetermined voltage.

23. A voltage regulator for controlling bidirectional current flow through a winding of an alternator according to claim 22 wherein the transient suppression circuit switches on the upper switch and the lower switch from each of the first and second pairs of switches to absorb the transient voltage spike.

24. A voltage regulator for controlling bidirectional current flow through a winding of an alternator according to claim 22 wherein the transient suppression circuit includes:

a zener diode connected to detect the transient voltage spike; and a plurality of directing diodes connected to the zener diode and to the switches to turn on the switches when a transient voltage spike is detected.

25. A voltage regulator for controlling bidirectional current flow through a winding of an alternator according to claim 24 wherein the plurality of directing diodes comprise a corresponding directing diode for each switch in the switching circuit, and the transient suppression circuit switches on the upper switch and the lower switch from each of the first and second pairs of switches to absorb the transient voltage spike in all of the switches in the switching circuit.

26. A method of controlling bidirectional current flow through a winding of an alternator, the method comprising:

switching a positive polarity voltage to the winding in a forward polarity mode to start or increase current flow in a forward direction through the winding;

switching a reverse polarity voltage to the winding in a reverse polarity mode to start or increase current flow in a reverse direction through the winding;

disconnecting the winding from the positive polarity voltage and the reverse polarity voltage in a decay mode to decrease the magnitude of current flow through the winding regardless of the direction of current flow in the winding; and connecting the winding to allow recirculating current flow through the winding during the decay mode as the magnitude of current flow through the winding is decreased.

27. A method of controlling bidirectional current flow through a winding of an alternator according to claim 26 further including the steps of:

monitoring the recirculating current flow through the winding during the decay mode to produce an inhibiting signal when recirculating current is flowing; and controlling the switching of the winding responsive to the inhibiting signal.

28. A method of controlling bidirectional current flow through a winding of an alternator according to claim 27 wherein:

the step of monitoring the recirculating current flow through the winding during the decay mode includes the step of monitoring the direction of recirculating current flow through the winding; and the step of controlling the switching of the winding includes controlling the switching of the winding to prevent entering the reverse polarity mode when recirculating forward direction current is flowing and controlling the switching of the winding to prevent entering the forward mode when recirculating reverse direction current is flowing.

* * * * *

UNITED STATES PATENT AND TRADEMARK OFFICE
CERTIFICATE OF CORRECTION

PATENT NO. : 5,502,368

DATED : March 26, 1996

INVENTOR(S) : Syverson et al.

It is certified that error appears in the above-identified patent and that said Letters Patent is hereby corrected as shown below:

Column 13, Line 14:  After "90°", delete "C".

Column 18, Line 49:  "FFTs" should read - - FETs - -.

Signed and Sealed this

Third Day of September, 1996

Attest:

BRUCE LEHMAN

Attesting Officer

Commissioner of Patents and Trademarks